United States Patent
Lv et al.

(10) Patent No.: US 12,497,351 B2
(45) Date of Patent: Dec. 16, 2025

(54) 3-N-CYCLOPROPYLMETHYL-2-FLUOROBENZAMIDE COMPOUND, PREPARATION METHOD THEREFOR AND USE THEREOF

(71) Applicant: CAC NANTONG CHEMICAL CO., LTD., Nantong (CN)

(72) Inventors: Liang Lv, Shanghai (CN); Jintao Zhu, Changsha (CN); Jiyong Liu, Shanghai (CN); Liangming Luo, Changsha (CN); Chaoqun Huang, Changsha (CN)

(73) Assignee: CAC NANTONG CHEMICAL CO., LTD (CN)

( * ) Notice: Subject to any disclaimer, the term of this patent is extended or adjusted under 35 U.S.C. 154(b) by 862 days.

(21) Appl. No.: 17/770,712

(22) PCT Filed: Oct. 26, 2020

(86) PCT No.: PCT/CN2020/123508
§ 371 (c)(1),
(2) Date: Apr. 21, 2022

(87) PCT Pub. No.: WO2021/078293
PCT Pub. Date: Apr. 29, 2021

(65) Prior Publication Data
US 2023/0020373 A1 Jan. 19, 2023

(30) Foreign Application Priority Data
Oct. 25, 2019 (CN) .......................... 201911023411.1

(51) Int. Cl.
| | | |
|---|---|---|
| *C07C 237/42* | (2006.01) | |
| *A01N 37/46* | (2006.01) | |
| *A01N 43/40* | (2006.01) | |
| *A01P 7/04* | (2006.01) | |
| *C07C 237/40* | (2006.01) | |
| *C07D 213/06* | (2006.01) | |
| *C07D 213/26* | (2006.01) | |
| *C07D 213/81* | (2006.01) | |
| *C07D 215/18* | (2006.01) | |

(52) U.S. Cl.
CPC .......... *C07C 237/40* (2013.01); *C07D 213/81* (2013.01); *C07D 215/18* (2013.01)

(58) Field of Classification Search
CPC ... C07C 237/42; C07C 237/40; C07D 213/81; C07D 213/06; C07D 213/35; C07D 213/26; A01P 7/04; A01N 37/46; A01N 43/40
See application file for complete search history.

(56) References Cited

U.S. PATENT DOCUMENTS

| | | | |
|---|---|---|---|
| 10,981,861 B1 * | 4/2021 | Zhu | C07C 231/12 |
| 11,180,443 B2 * | 11/2021 | Zhu | C07C 201/12 |
| 2011/0201687 A1 * | 8/2011 | Kobayashi | C07C 237/42 |
| | | | 564/155 |

FOREIGN PATENT DOCUMENTS

| | | |
|---|---|---|
| CN | 102119143 A | 7/2011 |
| CN | 108586279 A | 9/2018 |
| CN | 109497062 A | 3/2019 |
| CN | 109574956 A | 4/2019 |
| CN | 110028423 A | 7/2019 |
| EP | 3816150 A1 | 5/2021 |
| JP | 2013-150988 A | 8/2013 |
| WO | 2013/150988 A1 | 10/2013 |

OTHER PUBLICATIONS

Notice of Allowance, including Search Report received for Chinese Patent Application No. 202011118396.1, mailed on Jun. 29, 2022, 6 pages (3 pages of English Translation and 3 pages of Original Document).
Office Action received for Gernam Patent Application No. 112020005146.3, mailed on Aug. 1, 2024, 15 pages (8 pages of English Translation and 7 pages of Original Document).
Office Action received for Indian Patent Application No. 202217028909, mailed on Sep. 13, 2022, 5 pages.
Office Action received for Japanese Patent Application No. 2022-524149, mailed on May 30, 2023, 6 pages (3 pages of English Translation and 3 pages of Original Document).
Luo, Chunyan et al., Development of an Efficient Synthetic Porcess for Broflanilide, Organic Process Research & Development, 2020, American Chemical Society, pp. 1024-1031.
International Search Report in International Application No. PCT/CN2020/123508 dated Jan. 27, 2021.

* cited by examiner

*Primary Examiner* — Kamal A Saeed
*Assistant Examiner* — Sagar Patel
(74) *Attorney, Agent, or Firm* — Dilworth IP, LLC

(57) ABSTRACT

Disclosed are a 3-N-cyclopropylmethyl-2-fluorobenzamide compound, a preparation method therefor and the use thereof. The compound has a structure as represented by the following formula I. This compound can be used for the preparation of an m-diamide compound substituted with a 3-N-cyclopropylmethyl derivative. The m-diamide compound substituted with the 3-N-cyclopropylmethyl derivative, when serving as an insecticide, has the characteristics of a good fast-acting property, needing to use a low amount thereof, and being more beneficial for environmental protection. The 3-N-cyclopropylmethyl-2-fluorobenzamide compound is easy to synthesize and has mild conditions, and when used for preparing a m-diamide compound insecticide substituted with a 3-N-cyclopropylmethyl derivative, same is easy to synthesize and has a low synthesis cost and a high yield.

4 Claims, No Drawings

3-N-CYCLOPROPYLMETHYL-2-FLUOROBENZAMIDE COMPOUND, PREPARATION METHOD THEREFOR AND USE THEREOF

FIELD OF THE INVENTION

This application belongs to the technical field of organic synthesis, and relates to 3-N-cyclopropylmethyl-2-fluorobenzamide compound and preparation method therefor and use thereof.

BACKGROUND OF THE INVENTION

CN109497062A and CN110028423A disclosed insecticidal 3-N-cyclopropyl methyl meta-carboxamido benzamide derivatives.

CN110028423A disclosed two synthetic routes of 3-N-cyclopropyl methyl meta-carboxamido benzamide derivatives. The representative example of the first synthetic route was the preparation of TM1 by KC1 and KC2 under crucial condition in which tetrahydrofuran was the solvent and lithium diisopropylamide was the base, the reaction temperature was −70° C., the yield was low.

The representative example of the second synthetic route was the preparation of TM2 by KC3 and KC4, the yield was only 37.5%. And the synthesis of key intermediate KC4 according route 3, the reaction of KC5 and KC6 need to add a lot of N,N-Diisopropylethylamine, and catalyst was essential, the yield was only 59.2%.

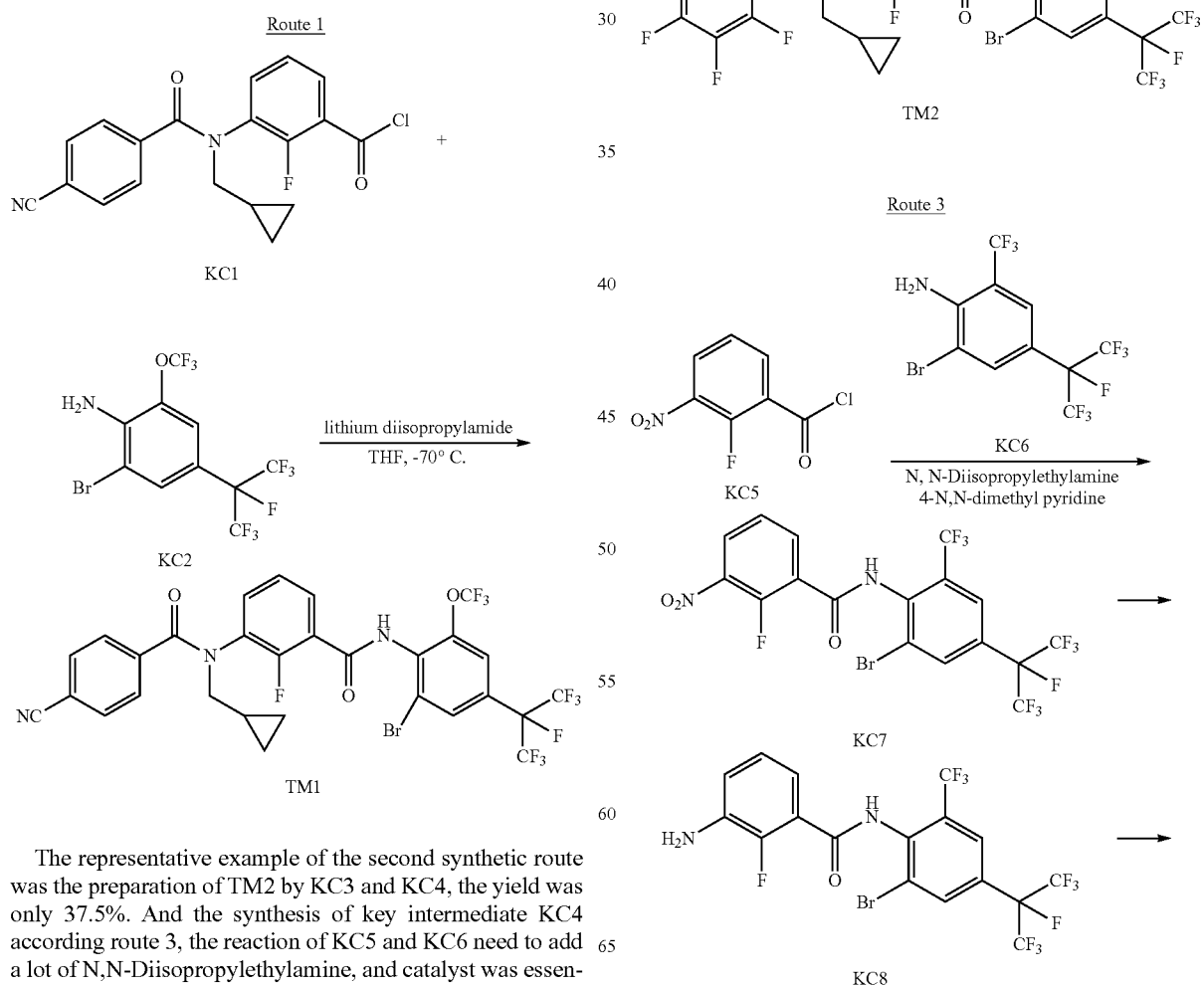

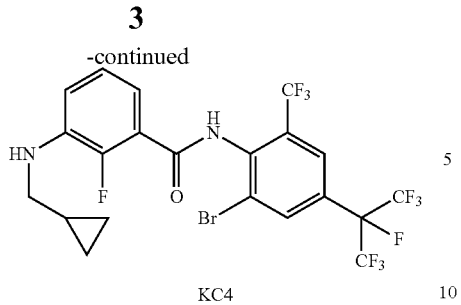

KC4

So the development of a mild method to synthesize the insecticidal 3-N-cyclopropyl methyl meta-carboxamide benzamide derivatives and their intermediate is expected.

SUMMARY OF THE INVENTION

This application provides a 3-N-cyclopropylmethyl-2-fluorobenzamide compound, a preparation method therefor and use thereof. These compounds can be used to prepare insecticidal 3-N-cyclopropyl methyl meta-carboxamido benzamide derivatives. The 3-N-cyclopropyl methyl meta-carboxamido benzamide derivatives have good insecticidal activity at low concentration and good quick-acting properties, and they are more conducive to environmental protection.

In an aspect, the present application provides a 3-N-cyclopropylmethyl-2-fluorobenzamide compound, which has a structure defined by Formula I:

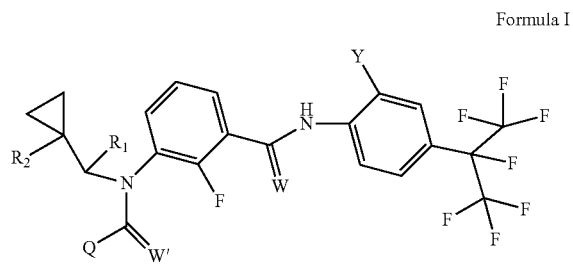

Formula I wherein:
Q is Q1, Q2 or Q3, that is

Q1

Q2

Q3 wherein represents the connection position of Q;

Y is selected from $C_1$-$C_6$ haloalkyl or $C_1$-$C_6$ haloalkoxyl;

$Z_1$, $Z_2$, $Z_3$, $Z_4$ and $Z_5$ are identical or different, and each selected from any one or a combination of at least two of H, F, Cl, Br, I, CN, $NO_2$, substituted or unsubstituted 3-10 membered heterocyclic group, $C_1$-$C_6$ alkyl, $C_1$-$C_6$ haloalkyl, $C_1$-$C_6$ alkoxyl, $C_1$-$C_6$ haloalkoxyl, $C_1$-$C_6$ alkylsulfinyl, $C_1$-$C_6$ haloalkylsulfinyl, $C_1$-$C_6$ alkylsulfonyl, or $C_1$-$C_6$ haloalkylsulfonyl;

$R_1$ is selected from H, $C_1$-$C_6$ alkyl, $C_1$-$C_6$ haloalkyl, $C_3$-$C_8$ cycloalkyl or $C_3$-$C_8$ cyclohaloalkyl;

$R_2$ is selected from H or halogen;

W and W' are each independently selected from O or S.

Preference is given to compounds of Formula I, in which Q is selected from Q1, Q2 or Q3; Y is selected from trifluoromethyl, pentafluoroethyl, heptafluoroisopropyl, trifluoromethoxyl, or difluoromethoxyl; $R_1$ is selected from H, methyl, monochloromethyl, monofluoromethyl, cyclopropyl or perfluorocyclopropyl; $R_2$ is selected from H, F or Cl; $Z_1$, $Z_2$, $Z_3$, $Z_4$ and $Z_5$ are identical or different, and each independently selected from H, F, Cl, Br, I, CN, trifluoromethyl, trifluoromethoxyl, methylsulfonyl or trifluoromethyl sulfonyl.

For the more preferred compounds of formula I, the 3-N-cyclopropyl methyl-2-fluorobenzamide compound is any one selected from Table 1.

TABLE 1

| Compound No. | Q | W | Y | $R_1$ | $R_2$ |
|---|---|---|---|---|---|
| 1.1 | (phenyl) | O | $CF_3$ | H | H |

TABLE 1-continued

| Compound No. | Q | W | Y | R$_1$ | R$_2$ |
| --- | --- | --- | --- | --- | --- |
| 1.2 | phenyl | O | CF$_3$ | Me | H |
| 1.3 | phenyl | O | CF$_3$ | Me | Cl |
| 1.4 | phenyl | O | CF$_3$ | Me | F |
| 1.5 | phenyl | O | CF$_3$ | CH$_2$Cl | H |
| 1.6 | phenyl | O | CF$_3$ | CH$_2$F | H |
| 1.7 | phenyl | O | CF$_3$ | CH$_2$Cl | Cl |
| 1.8 | phenyl | O | CF$_3$ | CH$_2$F | Cl |
| 1.9 | phenyl | S | CF$_3$ | H | H |
| 1.10 | 4-F-phenyl | O | CF$_3$ | H | H |
| 1.11 | 4-Cl-phenyl | O | CF$_3$ | H | H |

TABLE 1-continued
| Compound No. | Q | W | Y | R₁ | R₂ |
|---|---|---|---|---|---|
| 1.12 | 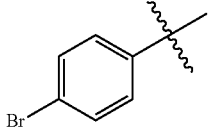 [SMILES: *c1ccc(Cl)cc1] | O | CF₃ | H | H |
| 1.13 | 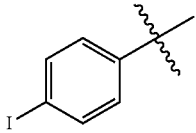 [SMILES: *c1ccc(I)cc1] | O | CF₃ | H | H |
| 1.14 | 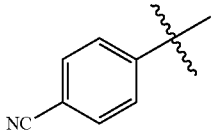 [SMILES: *c1ccc(C#N)cc1] | O | CF₃ | H | H |
| 1.15 | 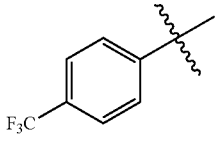 | O | CF₃ | H | H |
| 1.16 | 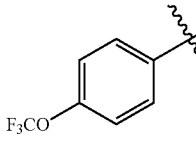 | O | CF₃ | H | H |
| 1.17 | 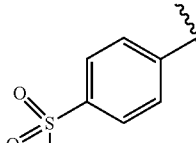 | O | CF₃ | H | H |
| 1.18 | 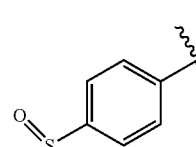 | O | CF₃ | H | H |
| 1.19 | 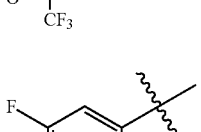 | O | CF₃ | H | H |
| 1.20 | 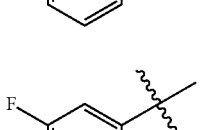 | O | CF₃ | H | H |

TABLE 1-continued

| Compound No. | Q | W | Y | $R_1$ | $R_2$ |
|---|---|---|---|---|---|
| 1.21 | 2,3-difluorophenyl | O | $CF_3$ | H | H |
| 1.22 | 3,4-difluorophenyl | O | $CF_3$ | H | H |
| 1.23 | phenyl | O | $OCF_3$ | H | H |
| 1.24 | 4-fluorophenyl | O | $OCF_3$ | H | H |
| 1.25 | 4-cyanophenyl | O | $OCF_3$ | H | H |
| 1.26 | phenyl | O | $OCF_2H$ | H | H |
| 1.27 | 4-fluorophenyl | O | $OCF_2H$ | H | H |
| 1.28 | 4-cyanophenyl | O | $OCF_2H$ | H | H |
| 1.29 | 6-fluoropyridin-3-yl | O | $OCF_2H$ | H | H |
| 1.30 | 6-chloropyridin-3-yl | O | $OCF_2H$ | H | H |

TABLE 1-continued

| Compound No. | Q | W | Y | R₁ | R₂ |
|---|---|---|---|---|---|
| 1.31 | 4-pyridyl with 2-F | O | OCF$_2$H | H | H |
| 1.32 | 4-pyridyl with 2-Cl | O | OCF$_2$H | H | H |
| 1.33 | 5-pyridyl with 2-CF$_3$ | O | OCF$_2$H | H | H |
| 1.34 | 5-pyridyl with 2-Cl | O | OCF$_3$ | H | H |
| 1.35 | 5-pyridyl with 2-F | O | OCF$_3$ | H | H |
| 1.36 | 5-pyridyl with 2-CF$_3$ | O | OCF$_3$ | H | H |
| 1.37 | 4-pyridyl with 2-F | O | OCF$_3$ | H | H |
| 1.38 | 4-pyridyl with 2-Cl | O | OCF$_3$ | H | H |
| 1.39 | 5-pyridyl with 2-F | O | CF$_3$ | H | H |

TABLE 1-continued

| Compound No. | Q | W | Y | R₁ | R₂ |
|---|---|---|---|---|---|
| 1.40 | 6-chloropyridin-3-yl | O | $CF_3$ | H | H |
| 1.41 | 6-(trifluoromethyl)pyridin-3-yl | O | $CF_3$ | H | H |
| 1.42 | 2-fluoropyridin-4-yl | O | $CF_3$ | H | H |
| 1.43 | 2-chloropyridin-4-yl | O | $CF_3$ | H | H |
| 1.44 | 4-fluorophenyl | O | $OCF_2H$ | Me | H |
| 1.45 | 4-fluorophenyl | O | $OCF_2H$ | c-Pr | H |
| 1.46 | 6-fluoropyridin-3-yl | O | $OCF_2H$ | Me | H |
| 1.47 | 6-fluoropyridin-3-yl | O | $OCF_2H$ | c-Pr | H |
| 1.48 | 6-fluoropyridin-3-yl | O | $CF_3$ | Me | H |
| 1.49 | 6-fluoropyridin-3-yl | O | $CF_3$ | c-Pr | H |

TABLE 1-continued

| Compound No. | Q | W | Y | $R_1$ | $R_2$ |
|---|---|---|---|---|---|
| 1.50 | 2-fluoropyridin-4-yl | O | $CF_3$ | Me | H |
| 1.51 | 4-fluorophenyl | O | $CF_3$ | Me | H |
| 1.52 | 4-cyanophenyl | O | $CF_3$ | Me | H |
| 1.53 | 3,5-difluorophenyl | O | $CF_3$ | H | H |

Comments on compounds in Table 1: "H" represents hydrogen, "F" represents fluorine, "Cl" represents chlorine, "Br" represents bromine, "I" represents iodine, "CN" represents cyano, "$CH_2Cl$" represents monochloromethyl, "$CH_2F$" represents monofluoromethyl, "$CF_3$" represents trifluoromethyl, "$OCF_3$" represents trifluoromethoxyl, "$OCF_2H$" represents difluoromethoxyl, "c-Pr" represents cyclopropyl, "$MeS(O)_2$" represents methylsulfonyl, and "$CF_3S(O)_2$" represents trifluoromethyl sulfonyl.

For the further more preferred compounds of Formula I, Y is selected from trifluoromethyl, trifluoromethoxyl or difluoromethoxyl; $R_1$ is selected from H or methyl; $R_2$ is selected from H; $Z_1$, $Z_2$, $Z_3$, $Z_4$ and $Z_5$ are identical or different, and each independently selected from H, F, Cl, Br, I, CN, trifluoromethyl, trifluoromethoxyl, methylsulfonyl or trifluoromethyl sulfonyl.

For the particular preferred compounds of Formula I, the meta-carboxamido benzamide compound is any one selected from the following compounds:

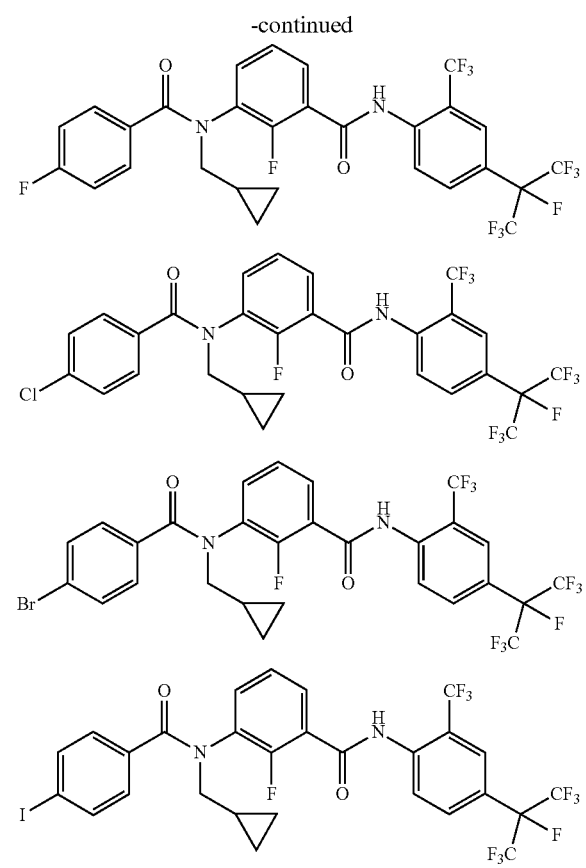

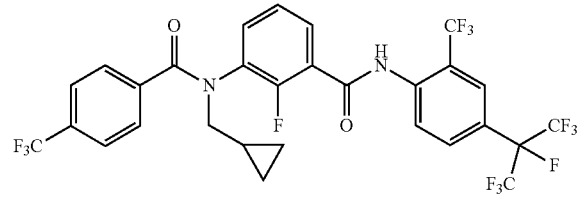
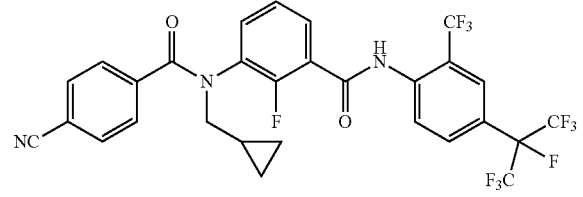
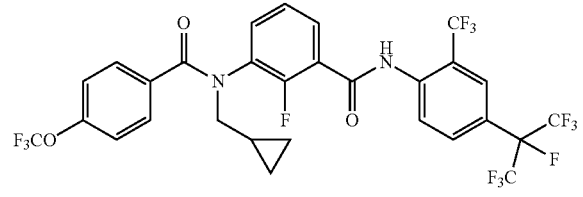
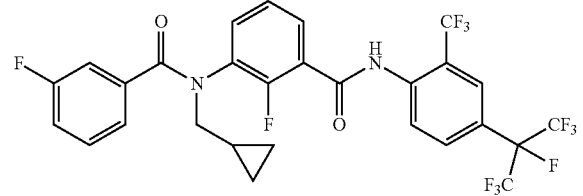
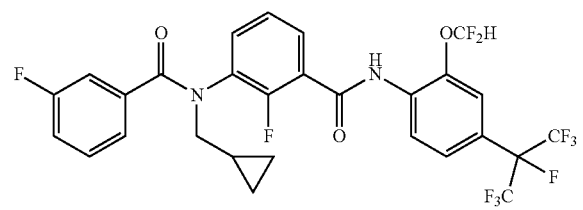
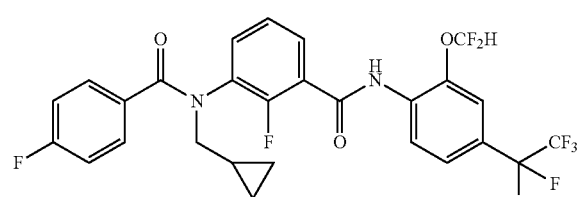
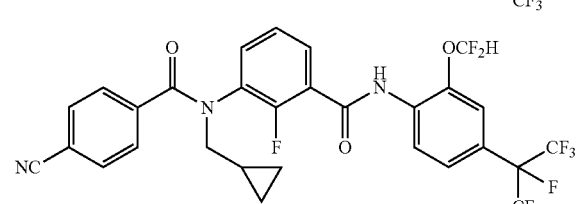
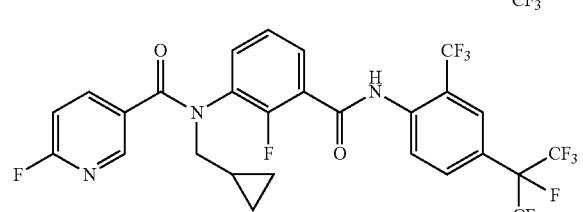
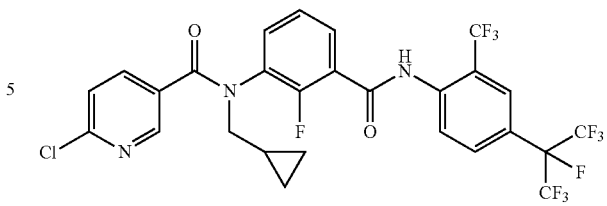
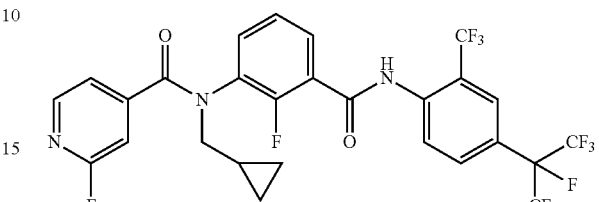
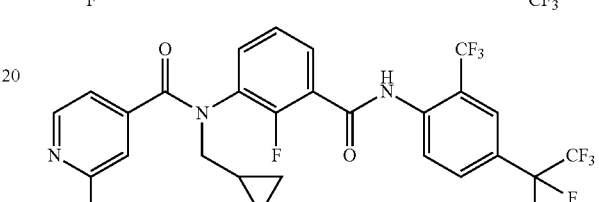
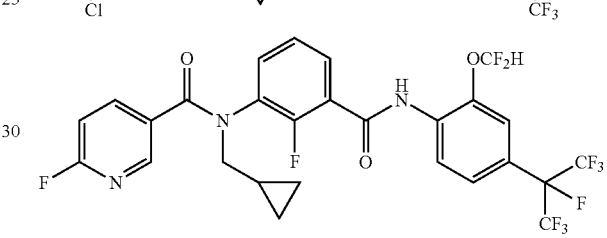
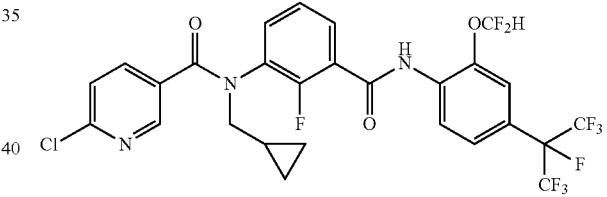
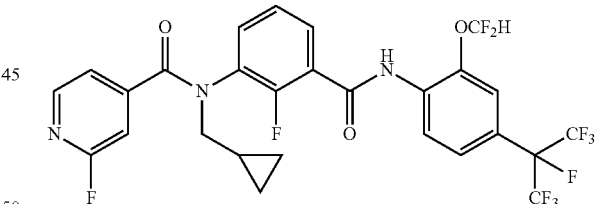
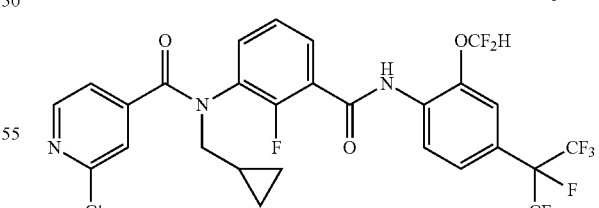
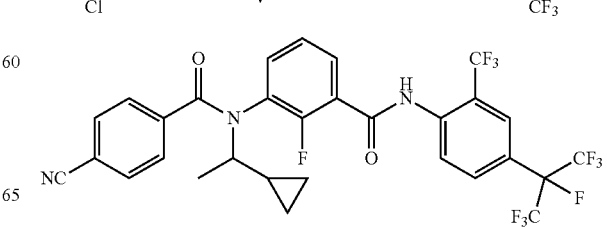

-continued

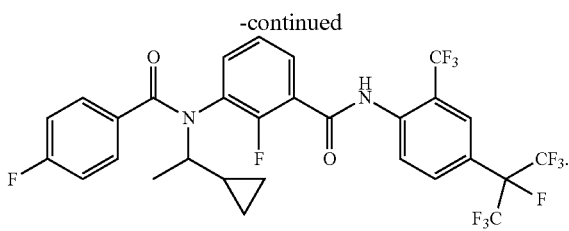

The present application further provides an intermediate represented by Formula II for preparation of 3-N-cyclopropyl methyl-2-fluorobenzamide compound of Formula I:

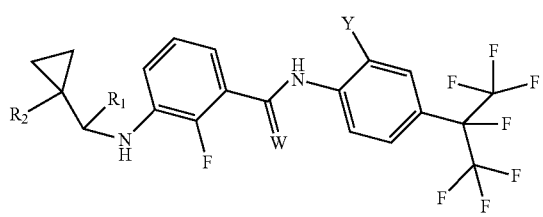

Formula II wherein,
Y is selected from $C_1$-$C_6$ haloalkyl or $C_1$-$C_6$ haloalkoxyl;
$R_1$ is selected from H, $C_1$-$C_6$ alkyl, $C_1$-$C_6$ haloalkyl, $C_3$-$C_8$ cycloalkyl, or $C_3$-$C_8$ cyclohaloalkyl;
$R_2$ is selected from H or halogen;
W is selected from O or S.

Preference is given to compounds of Formula II, in which Y is selected from trifluoromethyl, pentafluoroethyl, heptafluoroisopropyl, trifluoromethoxyl, or difluoromethoxyl; $R_1$ is selected from H, methyl, ethyl, n-propyl, i-propyl, n-butyl, i-butyl, t-butyl, n-pentyl, 1-methylbutyl, 2,2-dimethylpropyl, 2-methylbutyl, 1,3-dimethylbutyl, n-hexyl, monofluoromethyl, difluoromethyl, trifluoromethyl, monochloromethyl, dichloromethyl, trichloromethyl, pentafluoroethyl, heptafluoroisopropyl, cyclopropyl, cyclobutyl, cyclopentyl, perfluorocyclopropyl, perfluorocyclobutyl or perfluorocyclopentyl; $R_2$ is selected from H, F or Cl; W is selected from O or S.

For the more preferred compounds of Formula II, the 3-N-cyclopropyl methyl-2-fluorobenzamide compound is any one selected from Table 2.

TABLE 2

| Compound No. | W | Y | $R_1$ | $R_2$ |
|---|---|---|---|---|
| 2.1 | O | $CF_3$ | H | H |
| 2.2 | O | $CF_3$ | Me | H |
| 2.3 | O | $CF_3$ | Me | Cl |
| 2.4 | O | $CF_3$ | Me | F |
| 2.5 | O | $CF_3$ | $CH_2Cl$ | H |
| 2.6 | O | $CF_3$ | $CH_2F$ | H |
| 2.7 | O | $CF_3$ | $CH_2Cl$ | Cl |
| 2.8 | O | $CF_3$ | $CH_2F$ | Cl |
| 2.9 | S | $CF_3$ | H | H |
| 2.10 | O | $CF_3$ | $CH_2F$ | F |
| 2.11 | O | $OCF_3$ | H | H |
| 2.12 | O | $OCF_3$ | Me | H |
| 2.13 | O | $OCF_3$ | Me | Cl |
| 2.14 | O | $OCF_3$ | Me | F |
| 2.15 | O | $OCF_3$ | $CH_2Cl$ | H |
| 2.16 | O | $OCF_3$ | $CH_2F$ | H |
| 2.17 | O | $OCF_3$ | $CH_2Cl$ | Cl |
| 2.18 | O | $OCF_3$ | $CH_2F$ | Cl |
| 2.19 | O | $OCF_3$ | $CH_2Cl$ | F |
| 2.20 | O | $OCF_3$ | $CH_2F$ | F |
| 2.21 | O | $OCF_2H$ | H | H |
| 2.22 | O | $OCF_2H$ | Me | H |
| 2.23 | O | $OCF_2H$ | Me | Cl |
| 2.24 | O | $OCF_2H$ | Me | F |
| 2.25 | O | $OCF_2H$ | $CH_2Cl$ | H |
| 2.26 | O | $OCF_2H$ | $CH_2F$ | H |
| 2.27 | O | $OCF_2H$ | $CH_2Cl$ | Cl |
| 2.28 | O | $OCF_2H$ | $CH_2F$ | Cl |
| 2.29 | S | $OCF_2H$ | H | H |
| 2.30 | O | $OCF_2H$ | $CH_2F$ | F |

Comments on compounds in Table 2: "H" represents hydrogen, "F" represents fluorine, "Cl" represents chlorine, "c-Pr" represents cyclopropyl, "$CH_2C_1$" represents monochloromethyl, "$CH_2F$" represents monofluoromethyl, "S" represents sulfur atom, "OMe" represents methoxyl, "$CF_3$" represents trifluoromethyl, "$OCF_3$" represents trifluoromethoxyl, "$OCF_2H$" represents difluoromethoxyl.

For the further more preferred compounds of formula II, Y is selected from trifluoromethyl, trifluoromethoxyl or difluoromethoxyl; $R_1$ is selected from H or methyl; $R_2$ is selected from H; W is selected from oxygen.

The particular preferred compounds of Formula II are selected from any one of the following compounds:

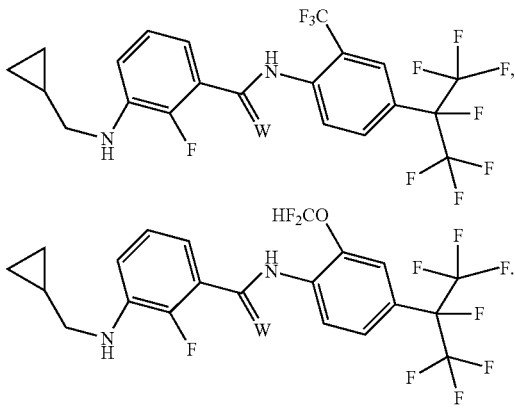

The present application also provides an intermediate represented by Formula III for preparation of compounds of Formula I and Formula II:

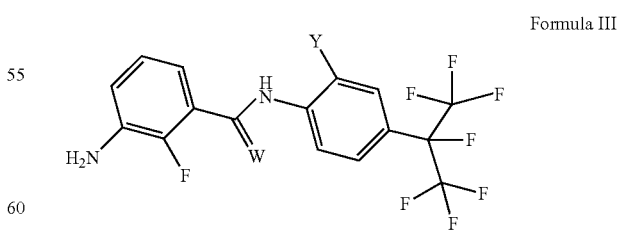

Formula III wherein:
Y is selected from $C_1$-$C_6$ haloalkyl or $C_1$-$C_6$ haloalkoxyl;
W is selected from O or S.
Preference is given to compounds of Formula III, in which Y is selected from trifluoromethyl, pentafluoroethyl, heptafluoroisopropyl, trifluoromethoxyl, or difluoromethoxyl; W is selected from O or S.

The more preferred compounds of Formula III are any one selected from Table 3.

TABLE 3

| Compound No. | W | Y |
|---|---|---|
| 3.1 | O | $CF_3$ |
| 3.2 | S | $CF_3$ |
| 3.3 | O | $OCF_3$ |
| 3.4 | S | $OCF_3$ |
| 3.5 | O | $OCF_2H$ |
| 3.6 | S | $OCF_2H$ |

The alkyl in the present application represents a straight-chain or branched alkyl group, for example methyl, ethyl, n-propyl, i-propyl, n-butyl, i-butyl, s-butyl, t-butyl, n-pentyl, i-pentyl, n-hexyl, and the like. Haloalkyl represents alkyl of which the hydrogen atom(s) is(are) replaced with one or more halogen atoms. Alkoxyl represents the alkyl having oxygen atom on the end, for example, methoxyl, ethoxyl, n-propoxyl, i-propoxyl, t-butxoyl, and the like. Haloalkoxyl represents alkoxyl of which the hydrogen atom(s) is(are) replaced with one or more halogen atoms. Halogen is F, Cl, Br or I.

As used herein, the term "$C_1$-$C_6$ alkyl" represents straight-chain or branched alkyl group having 1 to 6 carbon atoms, including but not limiting to methyl, ethyl, n-propyl, i-propyl, n-butyl, i-butyl, s-butyl, t-butyl, n-pentyl, i-pentyl, n-hexyl and the like. The term "$C_1$-$C_6$ haloalkyl" represents a straight-chain or branched alkyl group having 1 to 6 carbon atoms, that is substituted with a halogen atom(s), including but not limited to trifluoromethyl, difluoromethyl, 1,1,1-trifluoroethyl, pentafluoroethyl, heptafluoro-n-propyl, heptafluoroisopropyl and the like. The term "$C_1$-$C_6$ haloalkoxyl" refers to a straight-chain or branched alkoxyl group having 1 to 6 carbon atoms, which is substituted with a halogen atom(s), including but not limited to trifluoromethoxy, difluoromethoxy, 2,2,2-trifluoroethoxy, pentafluoroethoxy, heptafluoro-n-propoxy, heptafluoroisopropoxy and the like. The term "$C_3$-$C_8$ cycloalkyl" represents a cycloalkyl group having 3 to 8 carbon atoms, including but not limited to cyclopropyl, cyclobutyl, cyclopentyl, cyclohexyl, cycloheptanyl, cyclooctyl and the like. The term "$C_3$-$C_8$ halocycloalkyl" represents a cycloalkyl group having 3 to 8 carbon atoms, which is substituted with a halogen atom(s), including but not limited to 1-chlorocyclopropyl, 1-fluorocyclopropyl, perfluorocyclopropyl, 1-chlorocyclopentyl, 1-chlorocyclobutyl and the like.

$C_1$-$C_6$, $C_3$-$C_8$ and the like in front of a specific group mean the number of carbon atoms contained in the group, for example, $C_1$-$C_6$ represents the group may contain 1, 2, 3, 4, 5 or 6 carbon atoms, $C_3$-$C_8$ represents the group may contain 3, 4, 5, 6, 7 or 8 carbon atoms, and the like.

Furthermore, "H" represents hydrogen, "F" represents fluorine, "Me" represents methyl group, "c-Pr" represents cyclopropyl group, "$CH_2Cl$" represents monochloromethyl group, "$CH_2F$" represents monofluoromethyl group, "S" represents sulfur atom, "OMe" represents methoxyl group, "$CF_3$" represents trifluoromethyl group, "$OCF_3$" represents trifluoromethoxyl group, and "$OCF_2H$" represents difluoromethoxyl group.

Compounds of Formula I can be prepared by the following method. Various groups in the formula have a definition as above, unless otherwise specified.

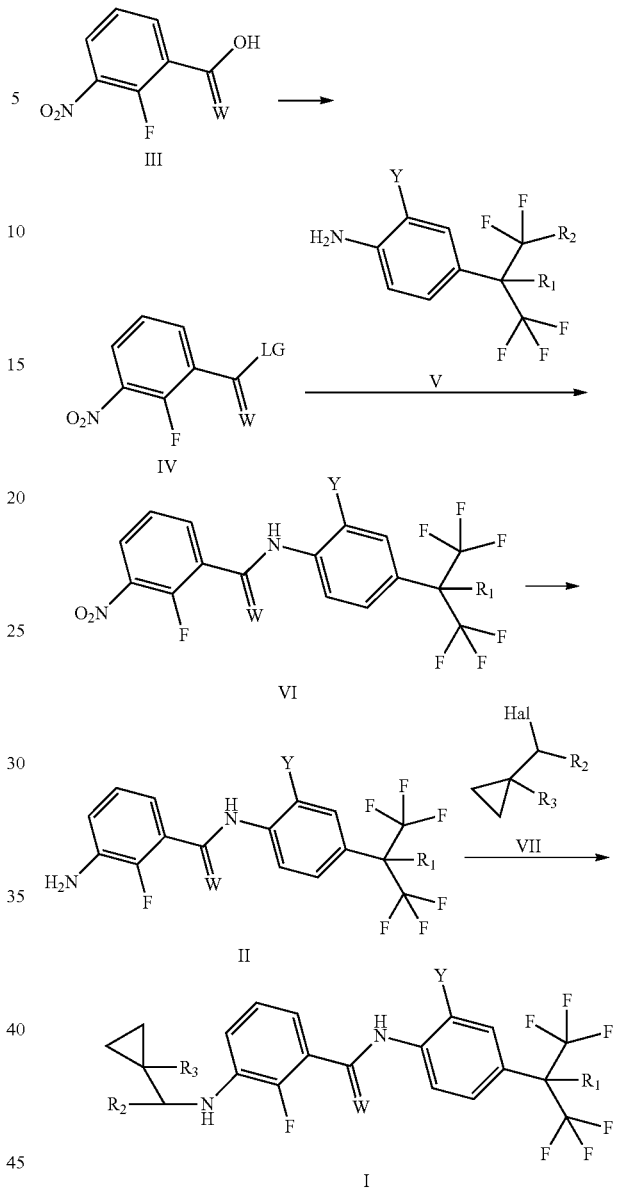

Wherein, the LG is selected from F, Cl, Br, $C_1$-$C_{12}$ alkoxyl, $C_1$-$C_{12}$ alkoxyl acyloxyl or $C_1$-$C_{12}$ alkyl acyloxyl; Hal is selected from F, Cl, Br or I; $R_1$, $R_2$, $R_3$, Y, W are defined identically as above, and will not be repeated here.

(i): Formula III→Formula IV

A compound represented by Formula IV having a LG group can be prepared by, via a well-known method, reacting a compound represented by the general formula III with thionyl chloride, oxalyl chloride, phosgene, phosphoryl chloride, phosphorus pentachloride, phosphorus trichloride, thionyl bromide, triphosgene, phosphorus tribromide, isopropyl chloroformate or the like.

(ii): By reacting a compound represented by the general Formula IV with a compound represented by the general Formula V, a compound represented by the general Formula VI can be prepared.

Preferably, the compound represented by Formula IV can be suitably selected in the range of 0.5 to 2 mole equivalents based on the compound represented by Formula V, such as 0.5:1, 0.8:1, 1:1, 1.2:1, 1.4:1, 1.6:1, 1.8:1 or 2:1.

The reaction of the step (ii) is carried on with presence of a base substance including organic bases and/or inorganic bases.

Preferably, examples of the organic bases include any one of trimethylamine, triethylamine, diisopropylethylamine, tri-n-butylamine, pyridine, piperidine, 3-methylpyridine, 2,6-dimethylpyridine, N-methylmorpholine, 3-methylimidazole, 4-N,N-dimethylaminopyridine, alkali alcoholate, lithium amino or a combination of at least two thereof.

Preferably, the alkali alcoholate is sodium methoxide and/or sodium ethoxide. Preferably, the lithium amino is lithium diisopropylamide.

Preferably, the inorganic bases include any one of alkali metal hydroxides, carbonates, phosphates or a combination of at least two thereof.

Preferably, the alkali metal hydroxides contain any one of lithium hydroxide, sodium hydroxide, potassium hydroxide or a combination of at least two thereof. Preferably, the carbonates include any one of sodium bicarbonate, sodium carbonate, potassium carbonate or a combination of at least two thereof. Preferably, the phosphates include dipotassium hydrogen phosphate and/or trisodium phosphate.

Preferably, the solvents of step (ii) may be any one of halogenated hydrocarbons, aromatic hydrocarbons, chained or cyclic ethers, esters, ketones, nitriles, or polar aprotic inert solvents or a combination of at least two thereof.

Preferably, the halogenated hydrocarbons include any one of methylene dichloride, chloroform or carbon tetrachloride or a combination of at least two thereof. Preferably, the aromatic hydrocarbons include any one of benzene, toluene, xylene, chlorobenzene or dichlorobenzene or a combination of at least two thereof. Preferably, the chained or cyclic ethers include any one of ether, tetrahydrofuran, dioxane or 1,2-dimethoxyethane or a combination of at least two thereof. Preferably, the esters include ethyl acetate and/or butyl acetate. Preferably, the ketones include any one of acetone, methyl isobutyl ketone, cyclohexanone or a combination of at least two thereof. Preferably, the nitriles include acetonitrile and/or propionitrile. Preferably, the polar aprotic inert solvents include any one of 1,3-dimethyl-2-imidazolinone, sulfolane, dimethyl sulfoxide, N,N-dimethylformamide, N-methylpyrrolidone, N,N-dimethylacetamide or hexamethylphosphamide or a combination of at least two thereof.

Preferably, the reaction temperature of the reaction step (ii) can be selected within the range from −70° C. to the boiling point of the solvent used, such as −70° C., −50° C., −30° C., −10° C., −5° C., 0° C., 15° C., 25° C., 30° C., 35° C., 40° C., 45° C., 50° C., 60° C., 70° C., 75° C., 80° C., 85° C., 90° C. or the boiling point, i.e., the reflux temperature of the solvent used.

Preferably, the reaction time of the reaction step (ii) can be selected within the range from half an hour to 48 hours, such as 0.5 hour, 1 hour, 3 hours, 5 hours, 8 hours, 10 hours, 12 hours, 15 hours, 18 hours, 20 hours, 23 hours, 25 hours, 28 hours, 30 hours, 33 hours, 35 hours, 38 hours, 40 hours, 44 hours or 48 hours.

(iii): Formula VI→Formula II

An aromatic carboxamide derivative having an amino group represented by formula II can be derived from the aromatic carboxamide derivative having a nitro group represented by formula VI by means of a reduction reaction.

Such reduction is illustrated by a process using hydrogenation, a process using a metal compound (for example, stannous chloride) or a metal such as iron powder, zinc power and the like.

The hydrogenation reaction can be carried out in a suitable solvent in the presence of catalyst at atmospheric pressure or a higher pressure under a hydrogen atmosphere. Examples of the catalyst may include palladium catalysts such as palladium-carbon, cobalt catalysts, ruthenium catalysts, platinum catalysts and the like. Examples of the solvent may include alcohols such as methanol and ethanol; aromatic hydrocarbons such as benzene and toluene; chained or cyclic ethers such as ether and tetrahydrofuran; esters such as ethyl acetate.

Preferably, the hydrogenation reaction pressure can be selected within the range from 0.1 MPa to 10 MPa, such as 0.1 MPa, 0.5 MPa, 0.8 MPa, 1 MPa, 1.5 MPa, 2 MPa, 3 MPa, 4 MPa, 5 MPa, 6 MPa, 7 MPa, 8 MPa, 9 MPa or 10 MPa.

Preferably, the hydrogenation reaction temperature can be selected within the range from −20° C. to the boiling point of the solvent used, such as −20° C., −10° C., −5° C., 0° C., 5° C., 10° C., 15° C., 20° C., 25° C., 30° C., 35° C., 40° C., 45° C., 50° C., 60° C., 70° C., 75° C., 80° C. or the boiling point, i.e., the reflux temperature of the solvent used.

Preferably, the hydrogenation reaction time can be selected within the range from half an hour to 48 hours, such as 0.5 hour, 1 hour, 3 hours, 5 hours, 8 hours, 10 hours, 12 hours, 15 hours, 18 hours, 20 hours, 23 hours, 25 hours, 28 hours, 30 hours, 33 hours, 35 hours, 38 hours, 40 hours, 44 hours or 48 hours.

Preferably, the process using a metal compound or a metal is conducted in any one of methanol, ethanol, ethyl acetate or the mixture of at least two thereof.

Preferably, the metal compound is stannous chloride and the metal is any one of iron powder, zinc power or a combination of at least two thereof.

Preferably, the reaction temperature using a metal compound or a metal can be selected within the range from −10° C. to the boiling point of the solvent used, such as −10° C., −5° C., 0° C., 5° C., 10° C., 15° C., 20° C., 25° C., 30° C., 35° C., 40° C., 45° C., 50° C., 60° C., 70° C., 75° C., 80° C. or the boiling point, i.e., the reflux temperature of the solvent used.

Preferably, the reaction time using a metal compound or a metal can be selected within the range from half an hour to 48 hours, such as 0.5 hour, 1 hour, 3 hours, 5 hours, 8 hours, 10 hours, 12 hours, 15 hours, 18 hours, 20 hours, 23 hours, 25 hours, 28 hours, 30 hours, 33 hours, 35 hours, 38 hours, 40 hours, 44 hours or 48 hours.

(iv): Formula II+Formula VII→Formula I

Preferably, the compound represented by Formula II can be suitably selected in the range of 0.5 to 2 mole equivalents based on the compound represented by Formula VII, such as 0.5:1, 0.8:1, 1:1, 1.2:1, 1.4:1, 1.5:1, 1.8:1 or 2:1.

In the process of the reaction step (iv), a base can be used, including organic bases and/or inorganic bases.

Preferably, examples of the organic bases include any one of triethylamine, N,N-diisopropylethylamine, NN-dimethylaniline, pyridine, sodium carbonate, potassium carbonate, sodium methoxide, sodium ethoxide, sodium tert-butoxide, potassium tert-butoxide or a combination of at least two thereof.

Preferably, examples of the inorganic bases include any one of sodium hydroxide, potassium hydroxide or sodium hydride or a combination of at least two thereof.

Preferably, solvents of the reaction step (iv) include any one of dichloromethane, chloroform, toluene, ethyl acetate, acetone, acetonitrile, tetrahydrofuran, dioxane, NN-dimethylformamide, dimethyl sulfoxide or hexamethylphosphatidyl triamide or a combination of at least two thereof.

Preferably, the reaction temperature of the reaction step (iv) can be selected within the range from room temperature to the boiling point of the solvent used, such as 25° C., 30° C., 35° C., 40° C., 45° C., 50° C., 60° C., 70° C., 75° C., 80° C., 85° C., 90° C. or the boiling point, i.e., the reflux temperature of the solvent used.

Preferably, the reaction time of step (iv) can be selected within the range from half an hour to 48 hours, such as 0.5 hour, 1 hour, 3 hours, 5 hours, 8 hours, 10 hours, 12 hours, 15 hours, 18 hours, 20 hours, 23 hours, 25 hours, 28 hours, 30 hours, 33 hours, 35 hours, 38 hours, 40 hours, 44 hours or 48 hours.

On the other hand, this application provides the use of the 3-N-cyclopropylmethyl-2-fluorobenzamide compound represented by Formula I for preparation of a meta-carboxamido benzamide compound of Formula A,

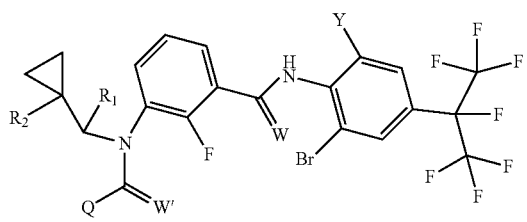

Formula A

Q is selected from

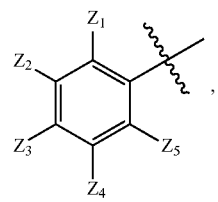

Q1

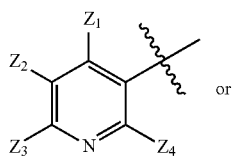

Q2

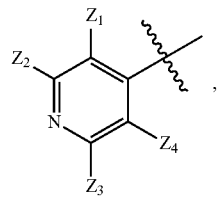

Q3 wherein represents the connection position of Q;
Y is selected from $C_1$-$C_6$ haloalkyl or $C_1$-$C_6$ haloalkoxyl;
$Z_1$, $Z_2$, $Z_3$, $Z_4$ and $Z_5$ are identical or different, and each independently selected from any one or a combination of at least two of H, F, Cl, Br, I, CN, $NO_2$, substituted or unsubstituted 3-10 membered heterocyclic group, $C_1$-$C_6$ alkyl, $C_1$-$C_6$ haloalkyl, $C_1$-$C_6$ alkoxyl, $C_1$-$C_6$ haloalkoxyl, $C_1$-$C_6$ alkylsulfinyl, $C_1$-$C_6$ haloalkylsulfinyl, $C_1$-$C_6$ alkylsulfonyl, or $C_1$-$C_6$ haloalkylsulfonyl;

$R_1$ is selected from H, $C_1$-$C_6$ alkyl, $C_1$-$C_6$ haloalkyl, $C_3$-$C_8$ cycloalkyl, or $C_3$-$C_8$ cyclohaloalkyl;
$R_2$ is selected from H or halogen;
W and W' are each independently selected from O or S.

Preferably, the preparation of meta-carboxamido benzamide compounds represented by Formula A includes steps as follows:

(1) Compounds represented by the general Formula I can be prepared by reaction between a compound represented by the general Formula II with a compound represented by the general Formula B:

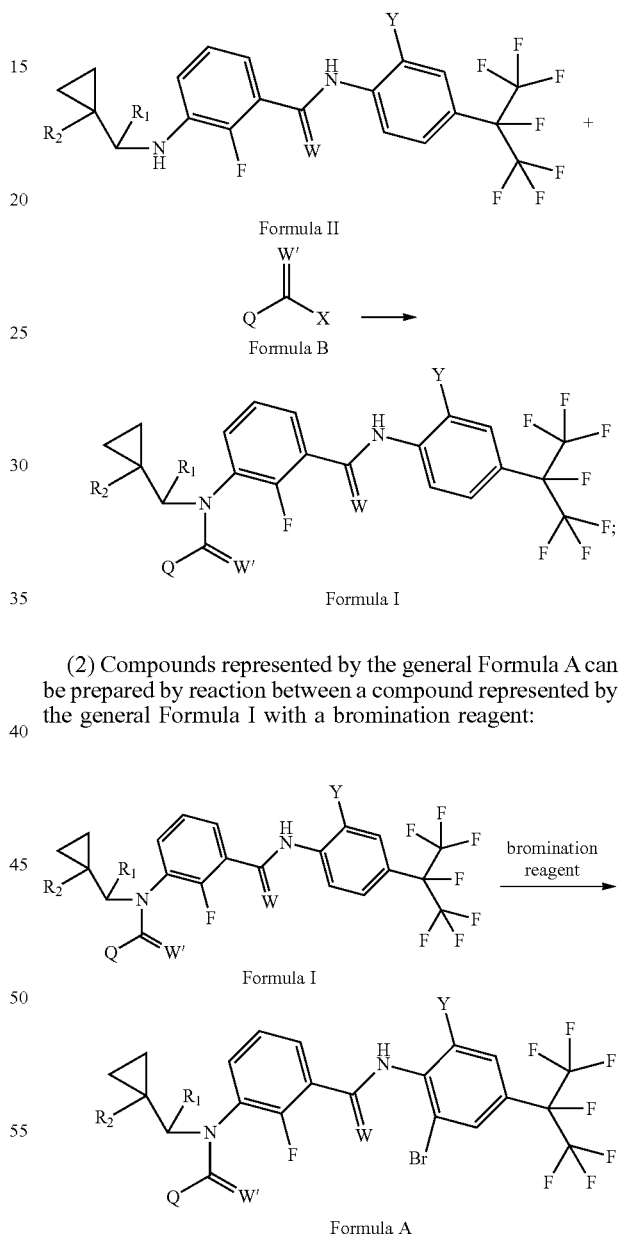

(2) Compounds represented by the general Formula A can be prepared by reaction between a compound represented by the general Formula I with a bromination reagent:

wherein Y, $R_1$, $R_2$, W, W' and Q are defined identically as above, and will not be repeated here.

Preferably, the 3-N-cyclopropylmethyl-2-fluorobenzamide compound represented by Formula II can be selected in the range of 0.5 to 2 mole equivalents based on the compound represented by Formula B, such as 0.5:1, 0.8:1, 1:1, 1.2:1, 1.4:1, 1.6:1, 1.8:1 or 2:1.

In the process of the reaction step (1), a base can be used, including organic bases and/or inorganic bases.

Preferably, examples of the organic bases include any one of triethylamine, N,N-diisopropylethylamine, N,N-dimethylaniline, pyridine, sodium acetate, potassium acetate, sodium carbonate, potassium carbonate, sodium bicarbonate, potassium bicarbonate, sodium methoxide, sodium ethoxide, sodium tert-butoxide, or potassium tert-butoxide or a combination of at least two thereof.

Preferably, the inorganic base contains any one of sodium hydroxide, potassium hydroxide, sodium hydride or a combination of at least two thereof.

Preferably, the solvents of reaction step (1) are selected from methylene dichloride, chloroform, toluene, ethyl acetate, acetonitrile, tetrahydrofuran, dioxane, N,N-dimethylacetamide, dimethyl sulfoxide or hexamethylphosphamide or a combination of at least two thereof.

Preferably, the reaction temperature of the reaction step (1) can be selected within the range from 0° C. to the boiling point of the solvent used, such as 25° C., 30° C., 35° C., 40° C., 45° C., 50° C., 60° C., 70° C., 75° C., 80° C., 85° C., 90° C. or the boiling point, i.e., the reflux temperature of the solvent used.

Preferably, the reaction time of reaction step (1) can be selected within the range from 5 minutes to 48 hours, such as 5 minutes, 10 minutes, 20 minutes, 30 minutes, 1 hour, 3 hours, 5 hours, 8 hours, 10 hours, 12 hours, 15 hours, 18 hours, 20 hours, 23 hours, 25 hours, 28 hours, 30 hours, 33 hours, 35 hours, 38 hours, 40 hours, 44 hours or 48 hours.

Preferably, the bromination reagent of the reaction step (2) is N-bromosuccinimide.

Preferably, the solvent of the reaction step (2) is NN-dimethylformamide, N,N-dimethylacetamide, methylene dichloride, chloroform, tetrachloromethane or ethyl acetate.

Preferably, the reaction temperature of the reaction step (2) can be selected within the range from 0° C. to the boiling point of the solvent used, such as 25° C., 30° C., 35° C., 40° C., 45° C., 50° C., 60° C., 70° C., 75° C., 80° C., 85° C., 90° C. or the boiling point, i.e., the reflux temperature of the solvent used.

Preferably, the reaction time of reaction step (2) can be selected within the range from 5 minutes to 48 hours, such as 5 minutes, 10 minutes, 20 minutes, 30 minutes, 1 hour, 3 hours, 5 hours, 8 hours, 10 hours, 12 hours, 15 hours, 18 hours, 20 hours, 23 hours, 25 hours, 28 hours, 30 hours, 33 hours, 35 hours, 38 hours, 40 hours, 44 hours or 48 hours.

Compared with the prior art, the present application has the following beneficial effects.

This application provides 3-N-cyclopropyl methyl-2-fluorobenzamide compounds, which are intermediates to prepare insecticides. These compounds are easy to be synthesized and have a low synthesizing cost as well as a high yield. When used for preparing 3-N-cyclopropyl methyl meta-carboxamido benzamide compound insecticides, they avoids the use of intermediates in the original route that require conditions not suitable for industrialization such as a low temperature of −70° C., water-free and oxygen-free condition or large quantities of organic bases. The preparation method in the present application has more mild reaction conditions, lower reacting risk, more environmental protection and high yield.

DETAILED DESCRIPTION

Technical solutions of the present application will be further described in the following Examples. Those skilled in the art should understand that the examples herein are only illustrative, and the present application is not limited thereto.

Preparation Example 1

Preparation of N-(4-(heptafluoroisopropyl)-2-(trifluoromethyl)phenyl)-3-(N-(cyclopropylmethyl)benzamido)-2-fluorobenzamide (Compound No. 2.1). The preparation method is as follows.

(1) Preparation of N-(4-(heptafluoroisopropyl)-2-(trifluoromethyl)phenyl)-2-fluoro-3-nitro benzamide

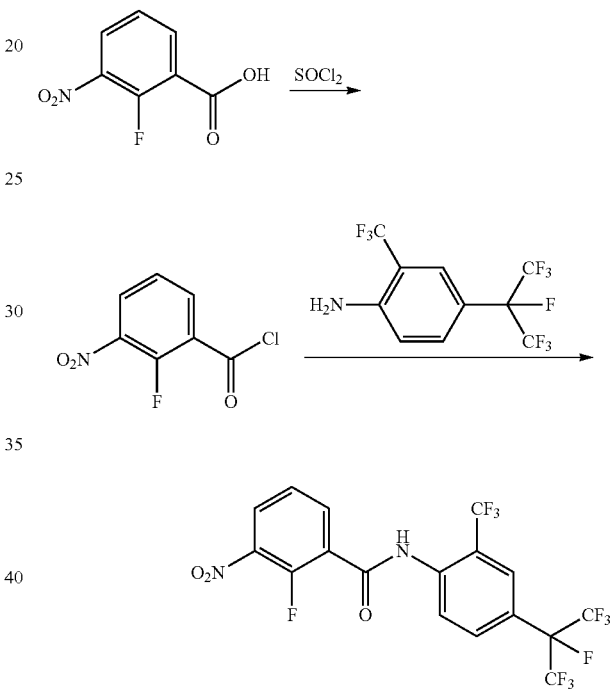

2-fluoro-3-nitrobenzoic acid (5.9 g, 31.9 mmol), toluene (60 mL) and thionyl chloride (7.6 g, 63.8 mmol) were added to a reaction flask in sequence. The mixture was heated and refluxed for 2 hours under stirring, and concentrated under reduced pressure to obtain 2-fluoro-3-nitrobenzoyl chloride. 4-(heptafluoroisopropyl)-2-(trifluoromethyl)aniline (10.0 g, 30.4 mmol) was added to 2-fluoro-3-nitrobenzoyl chloride, and toluene (10 mL) was added to the mixture. The mixture was heated to 120° C., and after 8 hours the reaction mixture was cooled to room temperature, and added with ethyl acetate (100 mL) and H$_2$O (100 mL) for extraction and layer separating. The organic layer was washed with saturated brine, dried over anhydrous sodium sulphate and concentrated under reduced pressure. The residue was purified by silica gel column chromatography (SGC) (eluent: petroleum ether (PE): ethyl acetate (EA)=9:1) to obtain the target compound (14.1 g, yellow solid, 93.4% yield).

$^1$H NMR (DMSO-d6, 400 MHz), δ[ppm]: 10.74 (s, 1H), 8.35 (t, J=8.5 Hz, 1H), 8.20-8.03 (m, 3H), 7.96 (s, 1H), 7.62 (t, J=8.0 Hz, 1H).

(2) Preparation of 3-amino-2-fluoro-N-(4-(heptafluoroisopropyl)-2-(trifluoromethyl)phenyl) benzamide

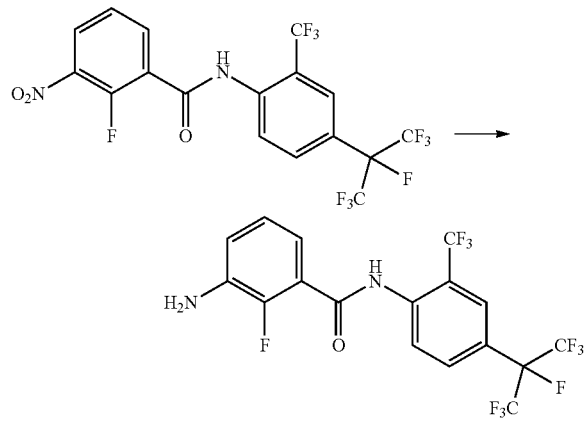

N-(4-(heptafluoroisopropyl)-2-(trifluoromethyl)phenyl)-2-fluoro-3-nitrobenzamide (5.0 g, 10.1 mmol) was dissolved in EtOH (50 mL), and concentrated hydrochloric acid (1.0 mL) and tin (II) chloride dihydrate (9.1 g, 40.3 mmol) were added in sequence. Then the mixture was heated and refluxed for 2 hours. After the reaction solution was evaporated to dryness, the pH of the mixture was adjusted by 10% sodium hydroxide solution to 12. The reaction mixture was extracted with EA (50 mL). The organic layer was washed with saturated brine and dried over anhydrous sodium sulphate. The mixture was concentrated under reduced pressure and the obtained residue was purified by SGC (eluent: PE:EA=5:1) to obtain 4.3 g (yield 91.5%) of yellow solid.

$^1$H NMR (DMSO-d6, 400 MHz), δ[ppm]: 10.14 (s, 1H), 8.16-8.03 (m, 2H), 7.93 (s, 1H), 7.07-6.92 (m, 2H), 6.86 (t, J=5.8 Hz, 1H), 5.43 (s, 2H).

(3) Preparation of N-(4-(heptafluoroisopropyl)-2-(trifluoromethyl)phenyl)-3-((cyclopropyl methyl)amino)-2-fluorobenzamide

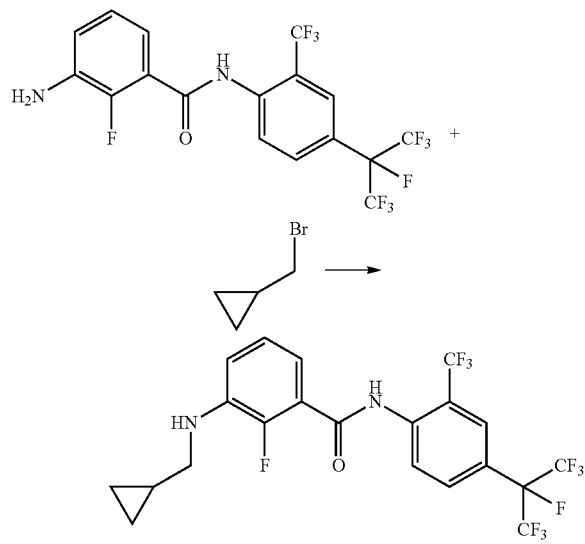

3-amino-2-fluoro-N-(4-(heptafluoroisopropyl)-2-(trifluoromethyl)phenyl)benzamide (4.0 g, 8.6 mmol) was dissolved in DMF (20 mL), and (bromomethyl)cyclopropane (1.7 g, 12.9 mmol) and potassium carbonate (2.4 g, 17.2 mmol) were added in sequence. Then the mixture was heated to 120° C. The reaction was under TLC monitor until completed, and then the reaction was finished. Ethyl acetate (100 mL) and H$_2$O (100 mL) were added for extraction and layer separating. The organic layer was taken and washed with saturated brine, and then dried over anhydrous sodium sulphate. The mixture was concentrated under reduced pressure and the obtained residue was purified by SGC (eluent: petroleum ether:ethyl acetate=9:1) to obtain 2.2 g (yield 49.2%) of the target compound as light yellow solid.

$^1$H NMR (DMSO-d6, 400 MHz), δ[ppm]: 10.18 (s, 1H), 8.12-8.07 (m, 1H), 8.04 (d, J=8.7 Hz, 1H), 7.92 (s, 1H), 7.10 (t, J=7.9 Hz, 1H), 6.94 (t, J=8.2 Hz, 1H), 6.90-6.82 (m, 1H), 5.82-5.72 (m, 1H), 3.03 (t, J=6.2 Hz, 2H), 1.12-1.08 (m, 1H), 0.50-0.42 (m, 2H), 0.24 (q, J=4.4 Hz, 2H).

Preparation Example 2

Preparation of N-(4-(heptafluoroisopropyl)-2-(difluoromethoxyl)phenyl)-3-(N-(1-cyclopropyl ethyl)benzamido)-2-fluorobenzamide

(1) Preparation of N-(4-(heptafluoroisopropyl)-2-(difluoromethoxyl)phenyl)-2-fluoro-3-nitro benzamide

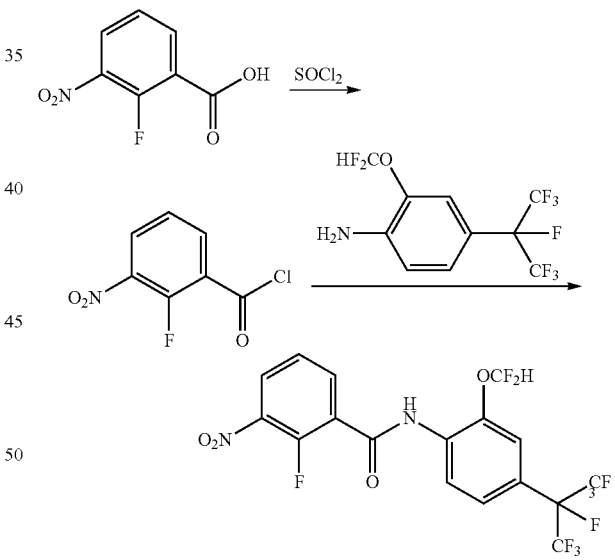

2-fluoro-3-nitrobenzoic acid (0.94 g, 5.1 mmol), toluene (10 mL) and thionyl chloride (1.2 g, 10.2 mmol) were added to a reaction flask in sequence. The mixture was heated and refluxed for 2 hours under stirring, and concentrated under reduced pressure to obtain 2-fluoro-3-nitrobenzoyl chloride. 4-(heptafluoroisopropyl)-2-(difluoromethoxyl)aniline (2.0 g, 4.9 mmol) was added to 2-fluoro-3-nitrobenzoyl chloride, and toluene (5 mL) was added to the mixture. The mixture was heated to 120° C., and after 8 hours the reaction mixture was cooled to room temperature, and added with ethyl acetate (30 mL) and H$_2$O (30 mL) for extraction and layer separating. The organic layer was washed with saturated brine, dried over anhydrous sodium sulphate and concentrated under reduced pressure. The residue was purified by SGC (eluent: petroleum ether:ethyl acetate=10:1) to obtain 2.3 g (yellow solid, yield 95.0%) of the target compound.

$^1$H NMR (DMSO-d6, 400 MHz), δ[ppm]: 10.62 (s, 1H), 8.42-8.30 (m, 2H), 8.13-8.04 (m, 1H), 7.71-7.53 (m, 3H), 7.35 (t, J=72.7 Hz, 1H).

(2) Preparation of 3-amino-2-fluoro-N-(4-(heptafluoroisopropyl)-2-(difluoromethoxyl)phenyl) benzamide

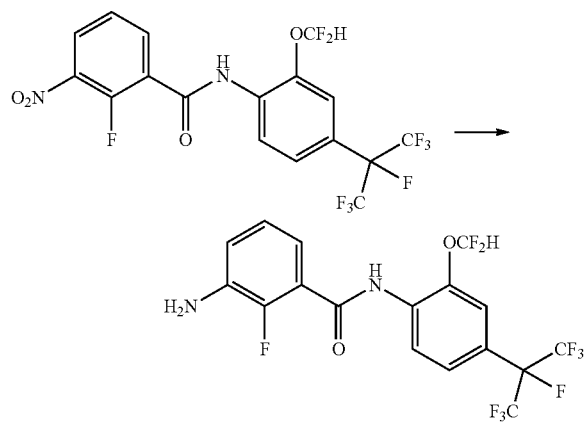

N-(4-(heptafluoroisopropyl)-2-(difluoromethoxyl)phenyl)-2-fluoro-3-nitrobenzamide (1.6 g, 3.0 mmol) was dissolved in the mixture of EtOH (20 mL) and H$_2$O (5 mL), and Zn powder (0.98 g, 15.0 mmol) and ammonium chloride (0.8 g, 15.0 mmol) were added in sequence. Then the mixture was heated and refluxed for 5 hours. After the reaction liquid was evaporated to dryness under reduced pressure, the pH of the mixture was adjusted by 10% sodium carbonate solution to 9-10. The reaction mixture was extracted with EA (50 mL). The organic layer was washed with saturated brine and dried over anhydrous sodium sulphate. The mixture was concentrated under reduced pressure and the obtained residue was purified by SGC (eluent: PE:EA=5:1) to obtain 1.31 g (yield 94.2%) of the target compound as yellow solid.

$^1$H NMR (DMSO-d6, 400 MHz), δ[ppm]: 9.97 (d, J=5.2 Hz, 1H), 8.39 (d, J=8.8 Hz, 1H), 7.64 (dd, J=8.8, 2.0 Hz, 1H), 7.51 (d, J=2.0 Hz, 1H), 7.62 (t, J=72.8 Hz, 1H), 5.45 (s, 2H).

(3) Preparation of N-(4-(heptafluoroisopropyl)-2-(difluoromethoxyl)phenyl)-3-((cyclopropyl methyl)amino)-2-fluorobenzamide

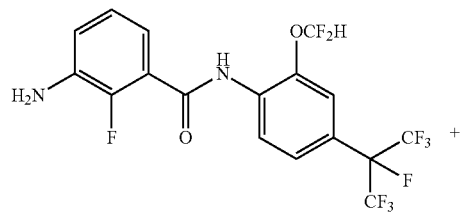

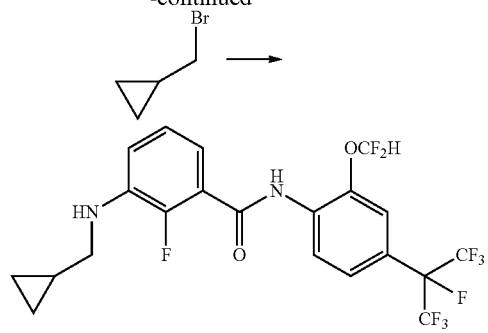

3-amino-2-fluoro-N-(4-(heptafluoroisopropyl)-2-(difluoromethoxyl)phenyl)benzamide (4.7 g, 10.0 mmol) was dissolved in DMF (20 mL), and (bromomethyl)cyclopropane (1.62 g, 12.0 mmol) and potassium carbonate (1.7 g, 12.0 mmol) were added in sequence. Then the mixture was heated to 120° C. for reaction. The reaction was under TLC monitor until completed, and then the reaction was finished. Ethyl acetate (100 mL) and H$_2$O (100 mL) were added for extraction and layer separating. The organic layer was washed with saturated brine, and then dried over anhydrous sodium sulphate. The mixture was concentrated under reduced pressure and the obtained residue was purified by SGC (eluent: petroleum ether:ethyl acetate=10:1) to obtain 2.7 g (yield 51.9%) of the target compound as light yellow solid.

$^1$H NMR (DMSO-d6, 400 MHz), δ[ppm]: 9.76 (d, J=4.8 Hz, 1H), 8.13 (d, J=8.7 Hz, 1H), 7.40-7.37 (m, 1H), 7.28-7.21 (m, 1H), 7.06 (5, J=72.0, 1H), 6.85 (t, J=8.0 Hz, 1H), 6.73-6.60 m, 2H), 5.55-5.42 (m, 1H), 2.82-2.73 (m, 2H), 0.72-0.65 (m, 1H), 0.28-0.18 (m, 2H), 0.05-0.01 (m, 2H).

Preparation Example 3

Preparation of the insecticidal compound N-(2-bromo-6-(trifluoromethyl)-4-(heptafluoroisopropyl)phenyl)-3-(N-(cyclopropylmethyl)-4-fluorobenzamido)-2-fluorobenzamide (Compound No. 62 in CN109497062A)

(1) Preparation of N-(2-(trifluoromethyl)-4-(heptafluoroisopropyl)phenyl)-3-(N-(cyclopropyl methyl)-4-fluorobenzamido)-2-fluorobenzamide

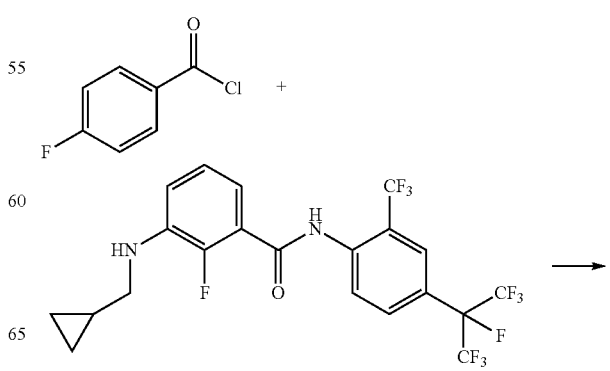

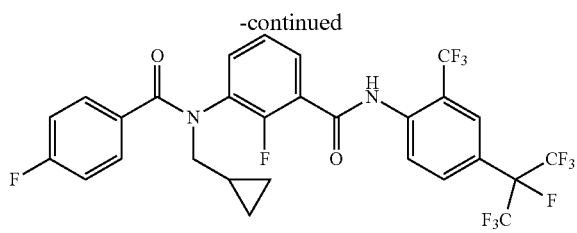

N-(2-(trifluoromethyl)-4-(heptafluoroisopropyl)phenyl)-3((cyclopropylmethyl)amino)-2-fluorobenzamide (0.30 g, 0.58 mmol), tetrahydrofuran (5 mL), pyridine (69 mg, 0.86 mmol) and 4-fluorobenzoyl chloride (0.11 g, 0.69 mmol) were added to a reaction flask in sequence. The mixture was warmed up to 80° C. for reaction, and after 4 hours the reaction mixture was cooled down to room temperature. The pH of the mixture was adjusted by 2M HCl to 6. EA (100 mL) and H$_2$O (100 mL) were added for extraction and layer separating. The organic layer was taken and washed with saturated sodium chloride aqueous solution, dried over anhydrous sodium sulphate and concentrated under reduced pressure. The residue was purified by SGC (eluent: PE:EA=6:1) to obtain 0.33 g (yield 89.2%) of the target compound as white solid.

$^1$H NMR (DMSO-d6, 400 MHz), δ[ppm]: 10.21 (s, 1H), 8.09 (d, J=8.0 Hz, 1H), 7.99 (d, J=8.0 Hz, 1H), 7.92 (s, 1H), 7.61-7.59 (m, 2H), 7.36-7.22 (m, 6H), 3.68 (d, J=52.0 Hz, 2H), 1.02 (brs, 1H), 0.40 (d, J=8.0 Hz, 2H), 0.08 (brs, 2H).

(2) Preparation of N-(2-bromo-4-(heptafluoroisopropyl)-6-(trifluoromethyl)phenyl)-3-(N-(cyclopropylmethyl)-4-fluorobenzamido)-2-fluorobenzamide

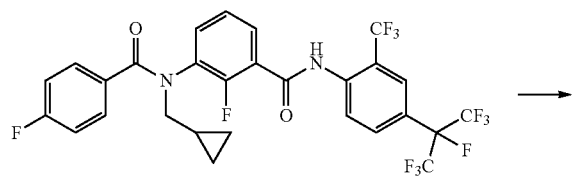

To a solution of N-(2-(trifluoromethyl)-4-(heptafluoroisopropyl)phenyl)-3-(N-(cyclopropyl methyl)-4-fluorobenzamido)-2-fluorobenzamide (0.15 g, 0.23 mmol) in DMF (4 mL) was added N-bromosuccinimide (45 mg, 0.26 mmol) and stirred at room temperature for 4 h. 20 mL EA and 20 mL H$_2$O were added to the reaction mixture for extraction and layer separating. The organic layer was washed with saturated sodium chloride aqueous solution, dried over anhydrous sodium sulphate and concentrated under reduced pressure. The residue was purified by SGC (eluent: PE:EA=5:1) to obtain 0.16 g (yield 94.1%) of the target compound as white solid.

$^1$H NMR (DMSO-d6, 400 MHz), δ[ppm]: 10.56 (s, 1H), 8.41 (s, 1H), 7.95 (s, 1H), 7.70-7.56 (m, 2H), 7.38-7.32 (m, 3H), 7.09 (br s, 2H), 3.69 (br s, 2H), 1.03-1.01 (m, 1H), 0.41-0.39 (m, 2H), 0.08-0.06 (m, 2H).

Preparation Example 4

Preparation of the insecticidal compound N-(2-bromo-6-(trifluoromethyl)-4-(heptafluoroisopropyl) phenyl)-3-(N-(cyclopropylmethyl)-benzamido)-2-fluorobenzamide (Compound No. 4 in CN109497062A)

(1) Preparation of N-(2-(trifluoromethyl)-4-(heptafluoroisopropyl)phenyl)-3-(N-(cyclopropyl methyl)-benzamido)-2-fluorobenzamide

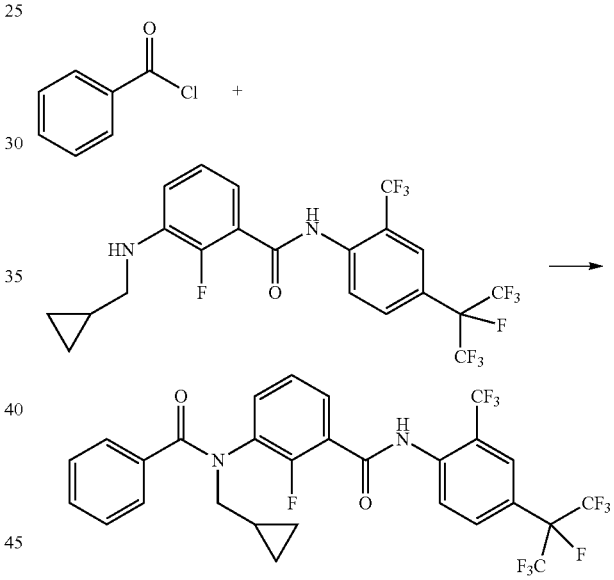

N-(2-(trifluoromethyl)-4-(heptafluoroisopropyl)phenyl)-3((cyclopropylmethyl)amino)-2-fluorobenzamide (0.30 g, 0.58 mmol), tetrahydrofuran (5 mL), pyridine (69 mg, 0.86 mmol) and benzoyl chloride (97 mg, 0.69 mmol) were added to a reaction flask in sequence. The mixture was warmed up to 80° C. for reaction, and after 4 hours the reaction mixture was cooled down to room temperature. The pH of the mixture was adjusted by 2M HCl to 6, and EA (100 mL) H$_2$O (100 mL) were added for extraction and layer separating. The organic layer was washed with saturated sodium chloride aqueous solution, dried over anhydrous sodium sulphate and concentrated under reduced pressure. The residue was purified by SGC (eluent: PE:EA=6:1) to obtain 0.34 g (yield 94.4%) of the target compound as white solid.

$^1$H NMR (DMSO-d6, 400 MHz), δ[ppm]: 10.21 (s, 1H), 8.09 (d, J=8.0 Hz, 1H), 7.99 (d, J=8.0 Hz, 1H), 7.92 (s, 1H), 7.61-7.59 (m, 2H), 7.36-7.22 (m, 6H), 3.68 (d, J=52.0 Hz, 2H), 1.02 (brs, 1H), 0.40 (d, J=8.0 Hz, 2H), 0.08 (brs, 2H).

(2) Preparation of N-(2-bromo-4-(heptafluoroisopropyl)-6-(trifluoromethyl)phenyl)-3-(N-(cyclopropylmethyl)-benzamido)-2-fluorobenzamide

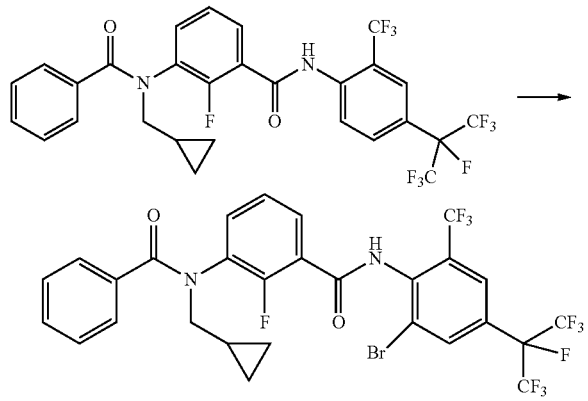

To a solution of N-(2-(trifluoromethyl)-4-(heptafluoroisopropyl)phenyl)-3-(N-(cyclopropyl methyl)-benzamido)-2-fluorobenzamide (0.14 g, 0.22 mmol) in DMF (4 mL) was added N-bromosuccinimide (44 mg, 0.25 mmol) and stirred at room temperature for 4 h. 20 mL EA and 20 mL H$_2$O was added to the reaction mixture for extraction and layer separating, and the organic layer was washed saturated sodium chloride aqueous solution, dried over anhydrous sodium sulphate and concentrated under reduced pressure. The residue was purified by SGC (eluent: PE:EA=5:1) to obtain 0.14 g (yield 90.3%) of the target compound as white solid.

$^1$H NMR (CDCl$_3$-d, 400 MHz), 8.15 (d, J=2.1 Hz, 1H), 8.03 (br s, 2H), 7.92 (d, J=2.1 Hz, 1H), 7.55 (br s, 1H), 7.35-7.21 (m, 5H), 3.84 (d, J=93.6 Hz, 2H), 1.14 (br s, 1H), 0.59-0.40 (m, 2H), 0.20 (d, J=42.2 Hz, 2H).

Preparation Example 5

Preparation of the insecticidal compound N-(2-bromo-6-(trifluoromethyl)-4-(heptafluoroisopropyl)phenyl)-3-(N-(cyclopropylmethyl)-4-chlorobenzamido)-2-fluorobenzamide (Compound No. 41 in CN109497062A)

(1) Preparation of N-(2-(trifluoromethyl)-4-(heptafluoroisopropyl)phenyl)-3-(N-(cyclopropyl methyl)-4-chlorobenzamido)-2-fluorobenzamide

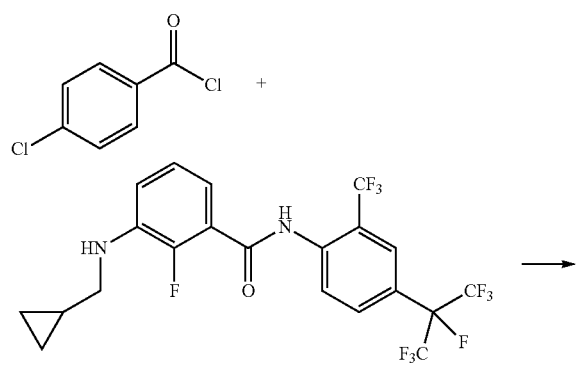

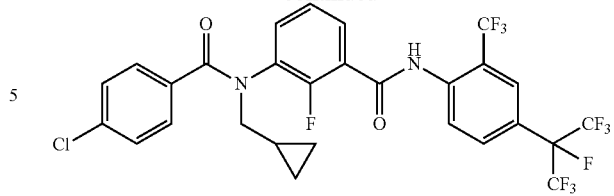

N-(2-(trifluoromethyl)-4-(heptafluoroisopropyl)phenyl)-3((cyclopropylmethyl)amino)-2-fluorobenzamide (0.30 g, 0.58 mmol), tetrahydrofuran (5 mL), pyridine (69 mg, 0.86 mmol) and 4-chlorobenzoyl chloride (120 mg, 0.69 mmol) were added to a reaction flask. The mixture was warmed up to 80° C. for reaction, and after 4 hours the reaction mixture was cooled down to room temperature, and the pH of the mixture was adjusted by 2M HCl to 6. 100 mL EA and 100 mL H$_2$O were added for extraction and layer separating. The organic layer was taken and washed with saturated sodium chloride aqueous solution, dried over anhydrous sodium sulphate and concentrated under reduced pressure. The residue was purified by SGC (eluent: PE:EA=6:1) to obtain 0.36 g (yield 94.2%) of the target compound as white solid.

$^1$H NMR (DMSO-d6, 400 MHz), δ[ppm]: 10.21 (s, 1H), 8.10 (dd, J=8.6, 2.1 Hz, 1H), 7.99 (d, J=8.6 Hz, 1H), 7.92 (t, J=2.3 Hz, 1H), 7.67-762 (m, 2H), 7.34-7.30 (m, 5H), 3.69 (d, J=23.9 Hz, 2H), 1.02 (brs, 1H), 0.40 (d, J=8.0 Hz, 2H), 0.09 (brs, 2H).

(2) Preparation of N-(2-bromo-4-(heptafluoroisopropyl)-6-(trifluoromethyl)phenyl)-3-(N-(cyclopropylmethyl)-4-chlorobenzamido)-2-fluorobenzamide

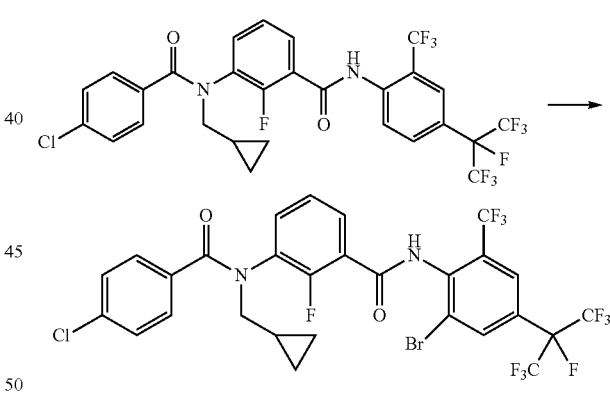

To a solution of N-(2-(trifluoromethyl)-4-(heptafluoroisopropyl)phenyl)-3-(N-(cyclopropylmethyl)-4-chlorobenzamido)-2-fluorobenzamide (0.17 g, 0.26 mmol) in DMF (4 mL) was added N-bromosuccinimide (50 mg, 0.28 mmol) and stirred at room temperature for 4 h. 20 mL EA and 20 mL H$_2$O were added to the reaction mixture for extraction and layer separating. The organic layer was washed saturated sodium chloride aqueous solution, dried over anhydrous sodium sulphate and concentrated under reduced pressure. The residue was purified by SGC (eluent: PE:EA=5:1) to obtain 0.18 g (yield 93.7%) of the target compound as white solid.

$^1$H NMR (DMSO-d6, 400 MHz), δ[ppm]: 8.18-7.84 (m, 4H), 7.53 (t, J=7.7 Hz, 1H), 7.37-7.07 (m, 4H), 3.81 (d, J=85.0 Hz, 2H), 1.11 (br s, 1H), 0.49 (br s, 2H), 0.17 (d, J=32.1 Hz, 2H).

Preparation Example 6

Preparation the insecticidal compound N-(2-bromo-6-(trifluoromethyl)-4-(heptafluoroisopropyl) phenyl)-3-(N-(cyclopropylmethyl)-4-bromobenzamido)-2-fluorobenzamide (1) Preparation of N-(2-(trifluoromethyl)-4-(heptafluoroisopropyl)phenyl)-3-(N-(cyclopropylmethyl)-4-bromobenzamido)-2-fluorobenzamide

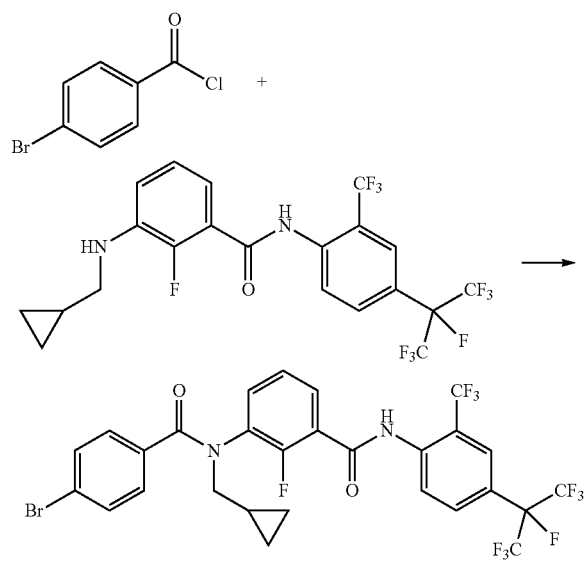

N-(2-(trifluoromethyl)-4-(heptafluoroisopropyl)phenyl)-3((cyclopropylmethyl)amino)-2-fluorobenzamide (0.30 g, 0.58 mmol), tetrahydrofuran (5 mL), pyridine (69 mg, 0.86 mmol) and 4-bromobenzoyl chloride (152 mg, 0.69 mmol) were added to a reaction flask. The mixture was warmed up to 80° C., after 4 hours the reaction mixture was cooled down to room temperature, and the pH of the mixture was adjusted by 2M HCl to 6. 100 mL EA and 100 mL H₂O were added for extraction and layer separating, and the organic layer was taken and washed with saturated sodium chloride aqueous solution, dried over anhydrous sodium sulphate and concentrated under reduced pressure. The residue was purified by SGC (eluent: PE:EA=6:1) to obtain 0.13 g (yield 32.06%) of the target compound as white solid.

¹H NMR (DMSO-d6, 400 MHz), δ[ppm]: 10.23 (s, 1H), 8.11 (d, J=8.7 Hz, 1H), 8.00 (d, J=8.6 Hz, 1H), 7.93 (s, 1H), 7.70-7.61 (m, 2H), 7.46 (s, 2H), 7.31 (dd, J=19.3, 11.8 Hz, 3H), 3.69 (d, J=15.9 Hz, 2H), 1.02 (brs, 1H), 0.41 (d, J=7.8 Hz, 2H), 0.10 (s, 2H).

(2) Preparation of N-(2-bromo-4-(heptafluoroisopropyl)-6-(trifluoromethyl)phenyl)-3-(N-(cyclopropylmethyl)-4-bromobenzamido)-2-fluorobenzamide

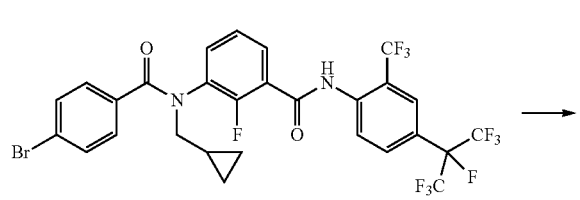

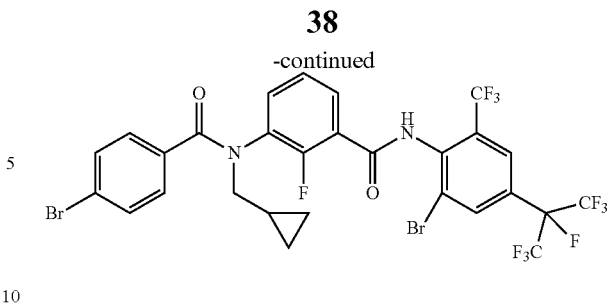

To a solution of N-(2-(trifluoromethyl)-4-(heptafluoroisopropyl)phenyl)-3-(N-(cyclopropyl methyl)-4-bromobenzamido)-2-fluorobenzamide (0.13 g, 0.18 mmol) in DMF (4 mL) was added N-bromosuccinimide (36 mg, 0.20 mmol) and stirred at room temperature for 4 h. 20 mL EA and 20 mL H₂O were added to the reaction mixture for extraction and layer separating, and the organic layer was washed with saturated sodium chloride aqueous solution, dried over anhydrous sodium sulphate and concentrated under reduced pressure. The residue was purified by SGC (eluent: PE:EA=5:1) to obtain 56 mg (yield 38.73%) of the target compound as white solid ¹H NMR (CDCl₃-d, 400 MHz), δ[ppm]: 400 MHz, CDCl₃-d, δ[ppm]: 8.13 (d, J=2.0 Hz, 1H), 8.05 (t, J=7.6 Hz, 1H), 7.90 (s, 1H), 7.54 (t, J=7.8 Hz, 1H), 7.32 (d, J=9.7 Hz, 2H), 7.21 (t, J=6.7 Hz, 3H), 3.81 (d, J=87.9 Hz, 2H), 1.10 (br s, 1H), 0.50 (br s, 2H), 0.18 (d, J=35.8 Hz, 2H).

Preparation Example 7

Preparation of the insecticidal compound N-(2-bromo-6-(trifluoromethyl)-4-(heptafluoroisopropyl)phenyl)-3-(N-(cyclopropylmethyl)-4-trifluoromethylbenzamido)-2-fluorobenzamide (Compound No. 37 in CN109497062A)

(1) Preparation of N-(2-(trifluoromethyl)-4-(heptafluoroisopropyl)phenyl)-3-(N-(cyclopropyl methyl)-4-trifluoromethylbenzamido)-2-fluorobenzamide

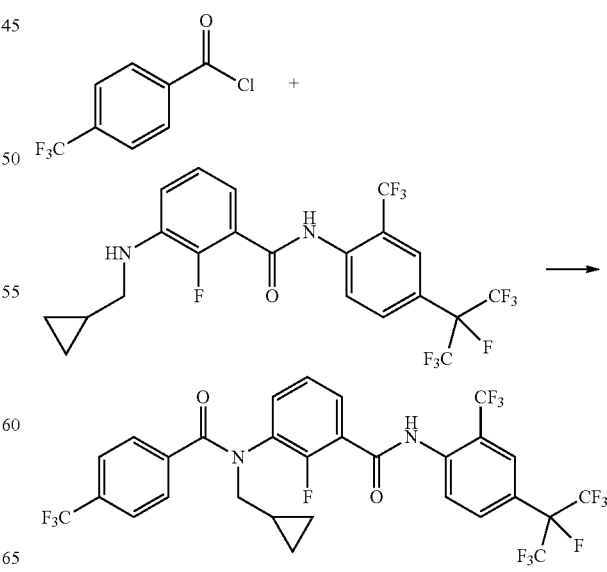

N-(2-(trifluoromethyl)-4-(heptafluoroisopropyl)phenyl)-3((cyclopropylmethyl)amino)-2-fluorobenzamide (0.30 g, 0.58 mmol), tetrahydrofuran (5 mL) pyridine (69 mg, 0.86 mmol) and 4-trifluoromethylbenzoyl chloride (144 mg, 0.69 mmol) were added to a reaction flask in sequence. The mixture was warmed up to 80° C., and after 4 hours the reaction mixture was cooled down to room temperature, and the pH of the mixture was adjusted by 2M HCl to 6. 100 mL EA and 100 mL H$_2$O were added for extraction and layer separating. The organic layer was taken and washed with saturated sodium chloride aqueous solution, dried over anhydrous sodium sulphate and concentrated under reduced pressure. The residue was purified by SGC (eluent: PE:EA=6:1) to obtain 0.38 g (yield 95.0%) of the target compound as colourless liquid.

$^1$H NMR (DMSO-d6, 400 MHz), δ[ppm]: 10.16 (s, 1H), 8.12 (dd, J=16.7, 8.3 Hz, 1H), 7.98 (d, J=8.6 Hz, 1H), 7.94-7.86 (m, 2H), 7.73-7.46 (m, 5H), 7.33 (s, 1H), 3.75 (brs, 2H), 1.04 (brs, 1H), 0.42 (d, J=7.2 Hz, 2H), 0.13 (s, 2H).

(2) Preparation of N-(2-bromo-4-(heptafluoroisopropyl)-6-(trifluoromethyl)phenyl)-3-(N-(cyclopropylmethyl)-4-trifluoromethylbenzamido)-2-fluorobenzamide

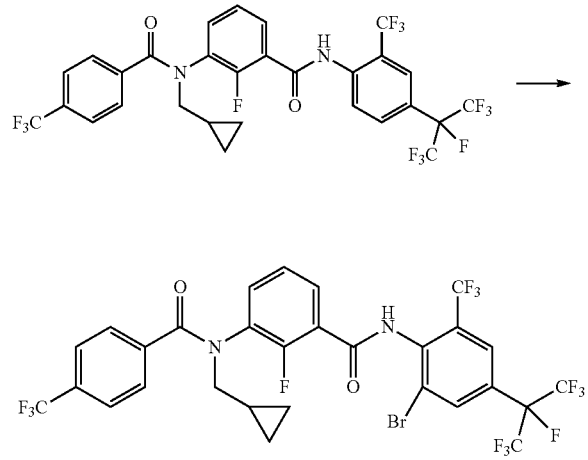

To a solution of N-(2-(trifluoromethyl)-4-(heptafluoroisopropyl)phenyl)-3-(N-(cyclopropyl methyl)-4-trifluoromethylbenzamido)-2-fluorobenzamide (0.14 g, 0.20 mmol) in DMF (4 mL) was added N-bromosuccinimide (39 mg, 0.22 mmol) and stirred at room temperature for 4 h. 20 mL EA and 20 mL H$_2$O were added to the reaction mixture for extraction and layer separating, and the organic layer was washed with saturated sodium chloride aqueous solution, dried over anhydrous sodium sulphate and concentrated under reduced pressure. The residue was purified by SGC (eluent: PE:EA=5:1) to obtain 140 mg (yield 90.9%) of the target compound as white solid.

$^1$H NMR (CDCl$_3$-d, 400 MHz), δ[ppm]: 8.21-7.79 (m, 4H), 7.66-7.28 (m, 5H), 3.85 (d, J=104.7 Hz, 2H), 1.12 (br s, 1H), 0.51 (br s, 2H), 0.20 (d, J=42.7 Hz, 1H).

Preparation Example 8

Preparation of the insecticidal compound N-(2-bromo-6-(trifluoromethyl)-4-(heptafluoroisopropyl)phenyl)-3-(N-(cyclopropylmethyl)-4-cyanobenzamido)-2-fluorobenzamide (Compound No. 32 in CN109497062A)

(1) Preparation of N-(2-(trifluoromethyl)-4-(heptafluoroisopropyl)phenyl)-3-(N-(cyclopropyl methyl)-4-cyanobenzamido)-2-fluorobenzamide

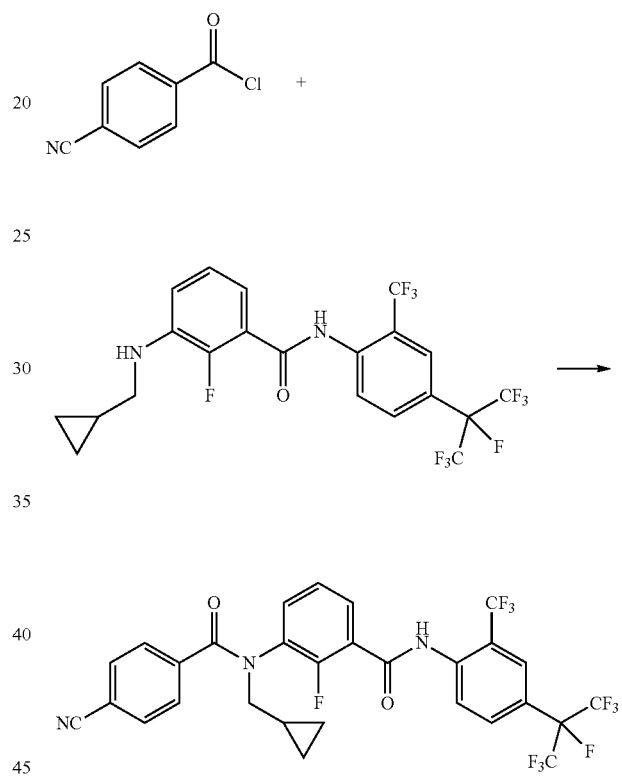

N-(2-(trifluoromethyl)-4-(heptafluoroisopropyl)phenyl)-3((cyclopropylmethyl)amino)-2-fluorobenzamide (0.30 g, 0.58 mmol), tetrahydrofuran (5 mL), pyridine (69 mg, 0.86 mmol) and 4-cyanobenzoyl chloride (114 mg, 0.69 mmol) were added to a reaction flask in sequence. The mixture was warmed up to 80° C., and after 4 hours the reaction mixture was cooled down to room temperature, and the pH of the mixture was adjusted by 2M HCl to 6. 100 mL EA and 100 mL H$_2$O were added for extraction and layer separating, and the organic layer was taken and washed with saturated sodium chloride aqueous solution, dried over anhydrous sodium sulphate and concentrated under reduced pressure. The residue was purified by SGC (eluent: PE:EA=6:1) to obtain 0.35 g (yield 92.8%) of the target compound as white solid.

$^1$H NMR (DMSO-d6, 400 MHz), δ[ppm]: 10.20 (s, 1H), 8.13-8.07 (m, 1H), 8.02-7.92 (m, 2H), 7.80-7.57 (m, 4H), 7.52-7.44 (m, 2H), 7.34-7.29 (m, 1H), 3.73 (s, 2H), 1.03 (brs, 1H), 0.42 (d, J=7.1 Hz, 2H), 0.12 (brs, 2H).

(2) Preparation of N-(2-bromo-6-(trifluoromethyl)-4-(heptafluoroisopropyl)phenyl)-3-(N-(cyclo propylmethyl)-4-cyanobenzamido)-2-fluorobenzamide

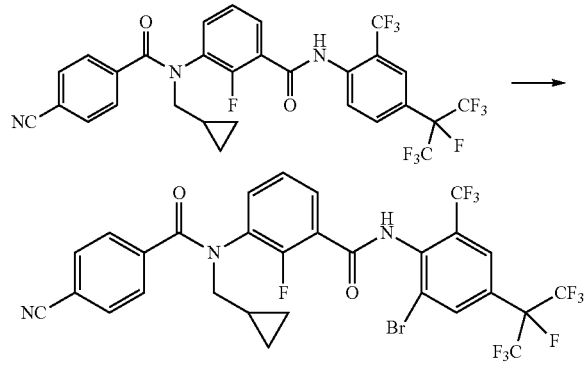

To a solution of N-(2-(trifluoromethyl)-4-(heptafluoroisopropyl)phenyl)-3-(N-(cyclopropyl methyl)-4-cyanobenzamido)-2-fluorobenzamide (0.16 g, 0.25 mmol) in DMF (4 mL) was added N-bromosuccinimide (48 mg, 0.27 mmol) and stirred at room temperature for 4 h. 20 mL EA and 20 mL H₂O were added to the reaction mixture for extraction and layer separating, and the organic layer was washed with saturated sodium chloride aqueous solution, dried over anhydrous sodium sulphate and concentrated under reduced pressure. The residue was purified by SGC (eluent: PE:EA=5:1) to obtain 170 mg (yield 93.4%) of the target compound as white solid.

$^1$H NMR (CDCl₃-d, 400 MHz), δ[ppm]: 8.14 (d, J=2.0 Hz, 1H), 8.12-7.94 (m, 2H), 7.91 (t, J=1.4 Hz, 1H), 7.58-7.39 (m, 4H), 7.32 (t, J=7.9 Hz, 1H), 3.81 (dd, J=76.0, 18.8 Hz, 2H), 1.11 (br s, 1H), 0.5 (br s, 2H), 0.20 (d, J=36.7 Hz, 2H).

Preparation Example 9

Preparation of the insecticidal compound N-(2-bromo-6-(difluoromethoxyl)-4-(heptafluoroisopropyl)phenyl)-3-(N-(cyclopropylmethyl)-4-fluorobenzamido)-2-fluorobenzamide (1) Preparation of N-(2-(difluoromethoxyl)-4-(heptafluoroisopropyl)phenyl)-3-(N-(cyclopropyl methyl)-4-fluorobenzamido)-2-fluorobenzamide

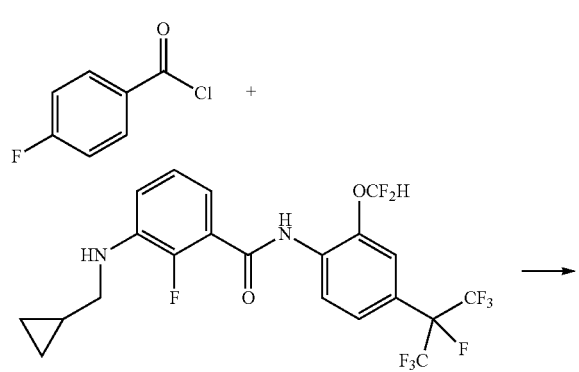

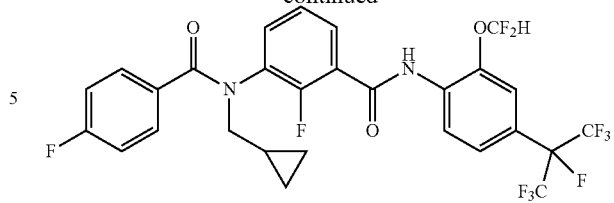

N-(2-(difluoromethoxyl)-4-(heptafluoroisopropyl)phenyl)-3((cyclopropylmethyl)amino)-2-fluorobenzamide (0.52 g, 1.0 mmol), tetrahydrofuran (5 mL), pyridine (0.12 g, 1.5 mmol) and 4-fluorobenzoyl chloride (0.18 mg, 1.1 mmol) were added to a reaction flask in sequence. The mixture was warmed up to 80° C., and after 2 hours the reaction mixture was cooled down to room temperature, and the pH of the mixture was adjusted by 2M HCl to 6. 100 mL EA and 100 mL H₂O were added for extraction and layer separating, and the organic layer was taken and washed with saturated sodium chloride aqueous solution, dried over anhydrous sodium sulphate and concentrated under reduced pressure. The residue was purified by SGC (eluent: PE:EA=6:1) to obtain 0.58 g (yield 90.5%) of the target compound as white solid.

$^1$H NMR (DMSO-d6, 400 MHz), δ[ppm]: 9.88 (s, 1H), 8.17 (d, J=8.7 Hz, 1H), 7.61-7.40 (m, 4H), 7.36-6.88 (m, 6H), 3.72-3.43 (m, 2H), 0.99-0.87 (m, 1H), 0.42-0.24 (m, 2H), 0.002 (s, 2H).

(2) Preparation of N-(2-bromo-6-(difluoromethoxyl)-4-(heptafluoroisopropyl)phenyl)-3-(N-(cyclopropylmethyl)-4-fluorobenzamido)-2-fluorobenzamide

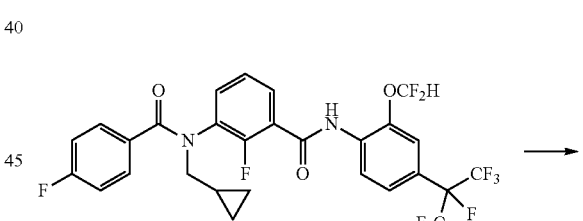

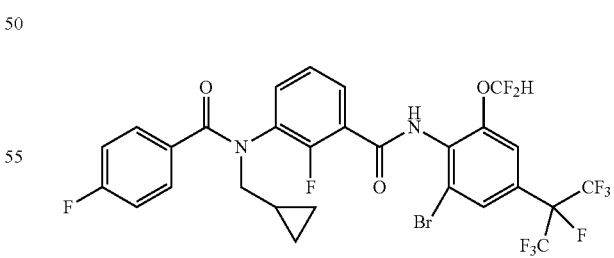

To a solution of N-(2-(difluoromethoxyl)-4-(heptafluoroisopropyl)phenyl)-3-(N-(cyclopropylmethyl)-4-fluorobenzamido)-2-fluorobenzamide (0.65 g, 1.0 mmol) in DMF (10 mL) was added N-bromosuccinimide (196 mg, 1.1 mmol) and stirred at room temperature for 5 h. 30 mL EA and 30 mL H₂O were added to the reaction mixture for reaction and layer separating, the organic layer was washed with saturated sodium chloride aqueous solution, dried over anhydrous sodium sulphate and concentrated under reduced pressure. The residue was purified by SGC (eluent: PE:EA=5:1) to obtain 0.67 g (yield 93.1%) of the target compound as white solid.

$^1$H NMR (DMSO-d6, 400 MHz), δ[ppm]: 10.32 (s, 1H), 7.90 (s, 1H), 7.67-7.51 (m, 4H), 7.38-7.33 (m, 3H), 7.15-7.09 (m, 2H), 3.70 (d, J=20.0 Hz, 2H), 1.06-1.01 (m, 1H), 0.41 (d, J=8.0 Hz, 2H), 0.09 (br s, 2H).

Preparation Example 10

Preparation of the insecticidal compound N-(3-((2-bromo-4-(heptafluoroisopropyl)-6-(trifluoro methyl) phenyl)carbamoyl)-2-fluorophenyl)-N-(cyclopropylmethyl)-6-fluoronicotinamide

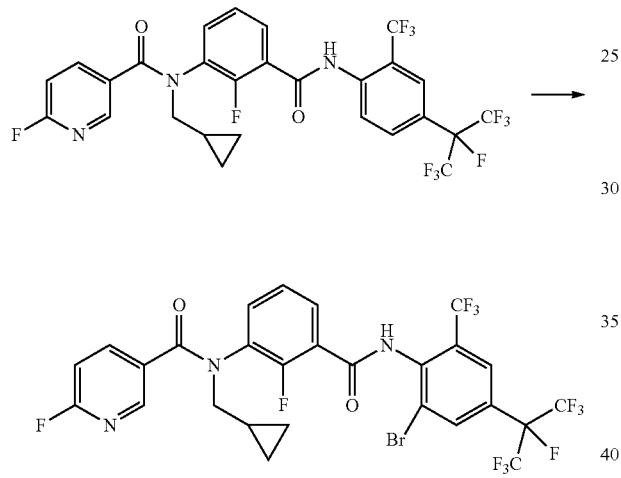

To a solution of N-(3-(2-(trifluoromethyl)4-(heptafluoroisopropyl)-phenyl)carbamoyl)-2-fluorophenyl)-N-(cyclopropylmethyl)-6-fluoronicotinamide (0.65 g, 1.0 mmol) in DMF (10 mL) was added N-bromosuccinimide (196 mg, 1.1 mmol) and stirred at room temperature for 5 h. 30 mL EA and 30 mL H$_2$O were added for extraction and layer separating, and the organic layer was taken and washed with saturated sodium chloride aqueous solution, dried over anhydrous sodium sulphate and concentrated under reduced pressure. The residue was purified by SGC (eluent: PE:EA=5:1) to obtain 0.65 g (yield 90.0%) of the target compound as white solid.

$^1$H NMR (DMSO-d6, 400 MHz), δ[ppm]: 10.62 (s, 1H), 8.42 (s, 1H), 8.15 (s, 1H), 7.95 (s, 2H), 7.78 (t, J=7.1 Hz, 1H), 7.62 (s, 1H), 7.39 (t, J=7.8 Hz, 1H), 7.12 (s, 1H), 3.74 (d, J=45.7 Hz, 2H), 1.03 (br s, 1H), 0.42 (d, J=6.4 Hz, 2H), 0.11 (d, J=27.7 Hz, 2H).

The applicant states that the 3-N-cyclopropylmethyl-2-fluorobenzamide compounds of this application, the preparation methods and applications thereof can be illustrated by the above examples, but this application is not limited thereto, i.e., which does not mean that the implementation of this application must rely on the above examples. Those skilled in the art should understand that any improvement to this application, equivalent replacement of the raw materials for preparing the compounds of this application, addition of auxiliary ingredients, selection of specific methods, etc., all fall within the scope of protection and disclosure of this application.

What is claimed is:
1. A 3-N-cyclopropylmethyl-2-fluorobenzamide compound, which has a structure defined by Formula I:

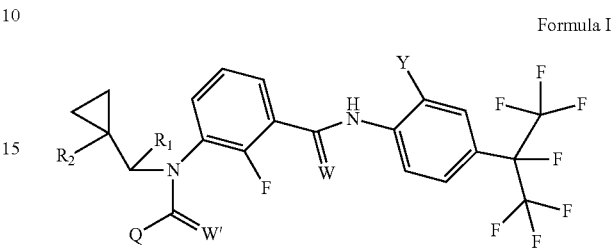

Formula I wherein:
Q is selected from

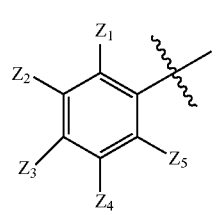

Q1

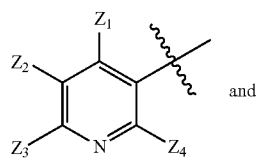

Q2 and

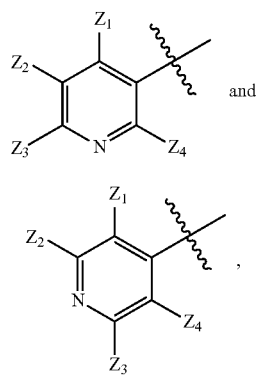

Q3 wherein ⸺ represents the connection position of Q;
Y is selected from C$_1$-C$_6$ haloalkyl and C$_1$-C$_6$ haloalkoxyl;
Z$_1$, Z$_2$, Z$_3$, Z$_4$ and Z$_5$ are identical or different, and each independently selected from any one or a combination of at least two of H, F, Cl, Br, I, CN, NO$_2$, substituted or unsubstituted 3-10 membered heterocyclic group, C$_1$-C$_6$ alkyl, C$_1$-C$_6$ haloalkyl, C$_1$-C$_6$ alkoxyl, C$_1$-C$_6$ haloalkoxyl, C$_1$-C$_6$ alkylsulfinyl, C$_1$-C$_6$ haloalkylsulfinyl, C$_1$-C$_6$ alkylsulfonyl, and C$_1$-C$_6$ haloalkylsulfonyl;
R$_1$ is selected from H, C$_1$-C$_6$ alkyl, C$_1$-C$_6$ haloalkyl, C$_3$-C$_8$ cycloalkyl, and C$_3$-C$_8$ cyclohaloalkyl;
R$_2$ is selected from H and halogen; and
W and W' are each independently selected from O and S.
2. The 3-N-cyclopropylmethyl-2-fluorobenzamide compound according to claim 1, wherein in Formula I, Y is selected from trifluoromethyl, pentafluoroethyl, heptafluoroisopropyl, trifluoromethoxyl, or difluoromethoxyl; R$_1$ is selected from H, methyl, monochloromethyl, monofluoromethyl, cyclopropyl and perfluorocyclopropyl; $R_2$ is selected from H, Cl and F; $Z_1$, $Z_2$, $Z_3$, $Z_4$ and $Z_5$ are identical or different, and each independently selected from H, F, Cl, Br, I, CN, trifluoromethyl, trifluoromethoxyl, methylsulfonyl and trifluoromethyl sulfonyl.

3. The 3-N-cyclopropylmethyl-2-fluorobenzamide compound according to claim 1, wherein in Formula I, Y is selected from trifluoromethyl, trifluoromethoxyl and difluoromethoxyl; $R_1$ is selected from H and methyl; $R_2$ is selected from H; $Z_1$, $Z_2$, $Z_3$, $Z_4$ and $Z_5$ are identical or different, and each independently selected from H, F, Cl, Br, I, CN, trifluoromethyl, trifluoromethoxyl, methylsulfonyl and trifluoromethyl sulfonyl.

4. The 3-N-cyclopropylmethyl-2-fluorobenzamide compound according to claim 1, wherein the 3-N-cyclopropylmethyl-2-fluorobenzamide compound is selected from any one of the compounds below:

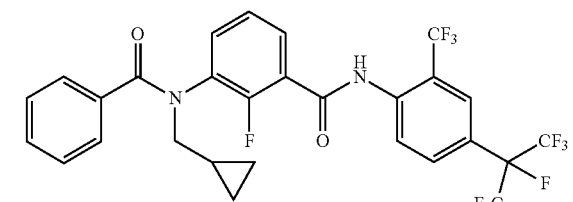

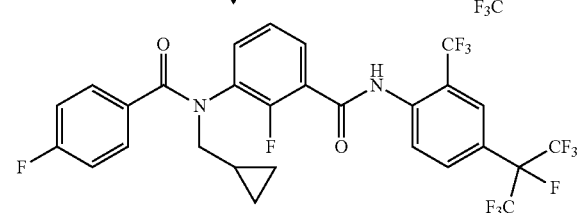

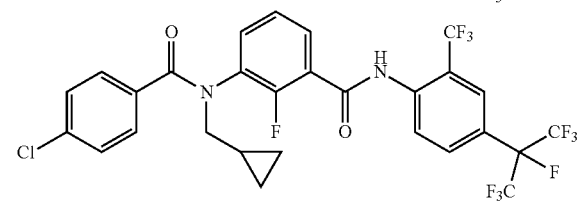

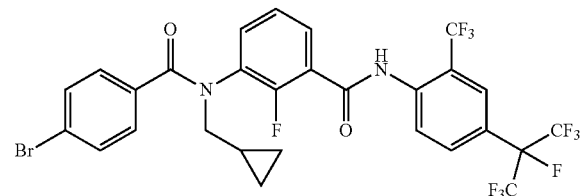

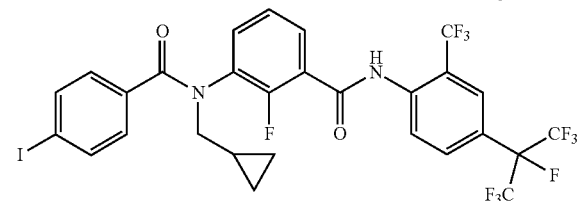

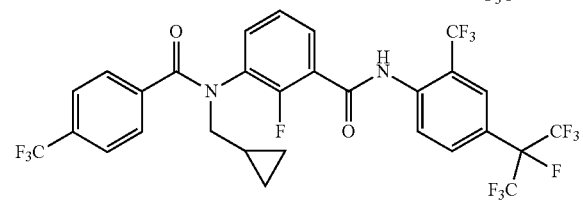

-continued

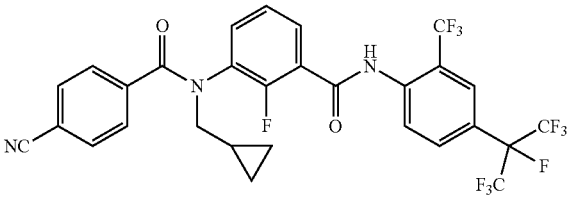

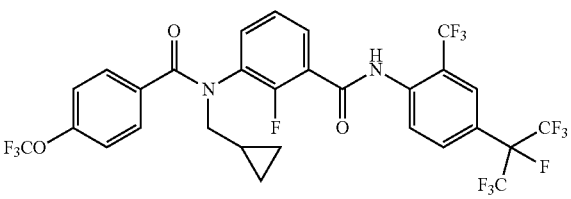

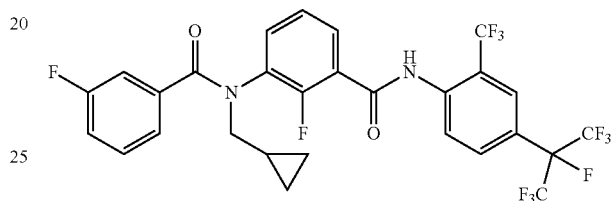

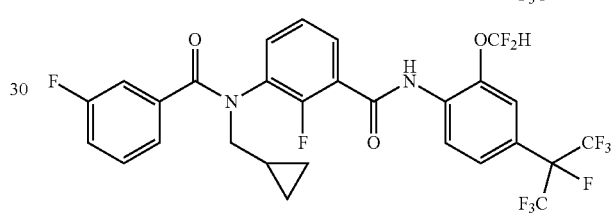

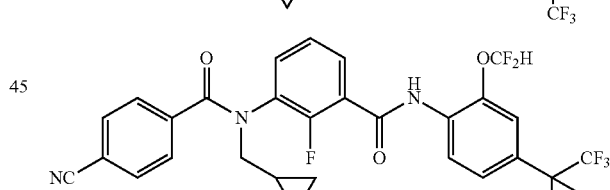

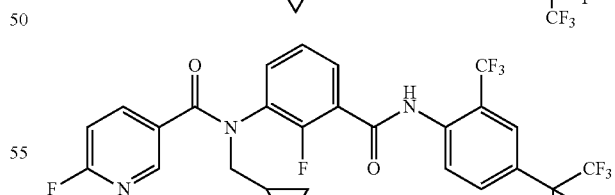

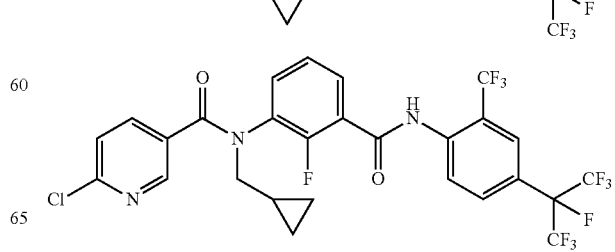

47
-continued
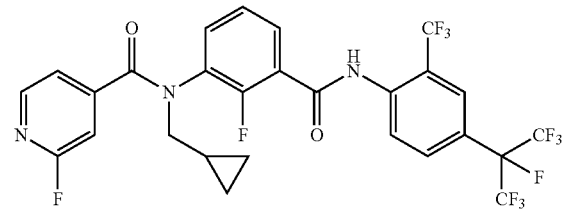
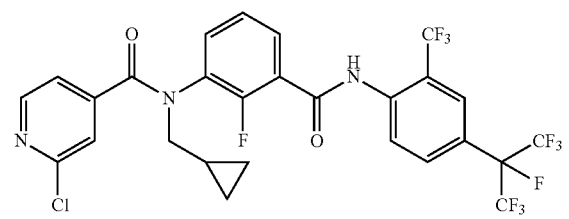
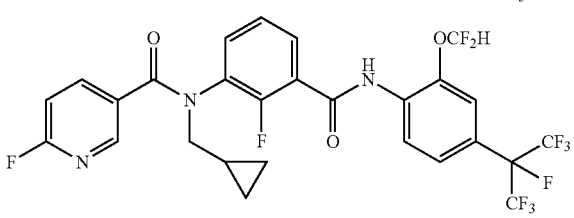
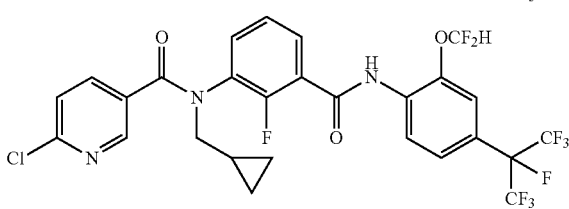
48
-continued
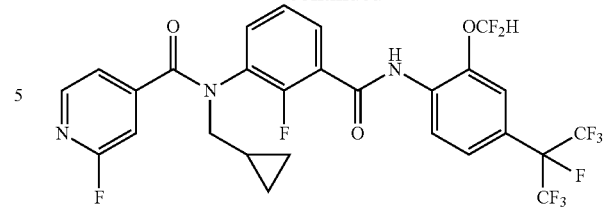
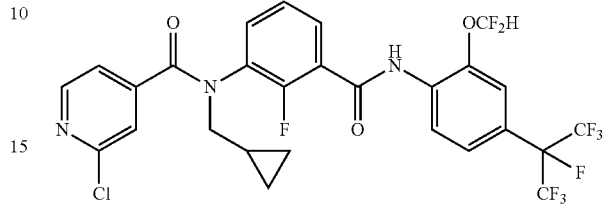
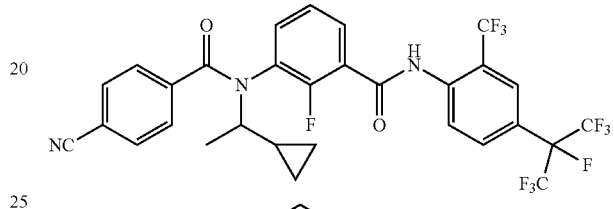
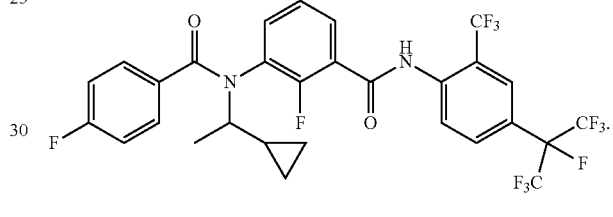
* * * * *